(12) United States Patent
Moon et al.

(10) Patent No.: US 12,182,033 B2
(45) Date of Patent: Dec. 31, 2024

(54) ADDRESS TRANSLATION CACHE AND SYSTEM INCLUDING THE SAME

(71) Applicant: Samsung Electronics Co., Ltd., Suwon-si (KR)

(72) Inventors: Youngsuk Moon, Suwon-si (KR); Hyunwoo Kang, Suwon-si (KR); Jaegeun Park, Suwon-si (KR); Sangmuk Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 76 days.

(21) Appl. No.: 17/965,700

(22) Filed: Oct. 13, 2022

(65) Prior Publication Data
US 2023/0169013 A1 Jun. 1, 2023

(30) Foreign Application Priority Data

Dec. 1, 2021 (KR) .................. 10-2021-0169763
May 25, 2022 (KR) .................. 10-2022-0063986

(51) Int. Cl.
*G06F 12/10* (2016.01)
*G06F 12/1045* (2016.01)
(Continued)

(52) U.S. Cl.
CPC ...... *G06F 12/1081* (2013.01); *G06F 12/1045* (2013.01); *G06F 13/28* (2013.01); *G06F 2212/652* (2013.01); *G06F 2213/28* (2013.01)

(58) Field of Classification Search
CPC .. G06F 12/10; G06F 12/1081; G06F 12/1045; G06F 2212/652; G06F 2213/28; G06F 13/28
See application file for complete search history.

(56) References Cited

U.S. PATENT DOCUMENTS 5,479,627 A 12/1995 Khalidi et al.
7,904,692 B2 3/2011 Mukherjee et al.
(Continued)

FOREIGN PATENT DOCUMENTS

WO WO-2019025748 A1 * 2/2019 ......... G06F 12/0864
WO WO-2021061466 A1 * 4/2021 .......... G06F 12/0811

OTHER PUBLICATIONS

J. Muck and J. Hays, "Architectural Support For Translation Table Management In Large Address Space Machines," Proceedings of the 20th Annual International Symposium on Computer Architecture, San Diego, CA, USA, 1993, pp. 39-50.*

(Continued)

*Primary Examiner* — Pierre Michel Bataille
(74) *Attorney, Agent, or Firm* — Muir Patent Law, PLLC

(57) ABSTRACT

An address translation cache (ATC) is configured to store translation entries indicating mapping information between a virtual address and a physical address of a memory device. The ATC includes a plurality flexible page group caches, a shared cache and a cache manager. Each flexible page group cache stores translation entries corresponding to a page size allocated to the flexible group cache. The shared cache stores, regardless of page sizes, translation entries that are not stored in the plurality of flexible page group caches. The cache manager allocates a page size to each flexible page group cache, manages cache page information on the page sizes allocated to the plurality of flexible page group caches, and controls the plurality of flexible page group caches and the shared cache based on the cache page information.

20 Claims, 26 Drawing Sheets

(51) Int. Cl.
*G06F 12/1081* (2016.01)
*G06F 13/28* (2006.01)

(56) References Cited

U.S. PATENT DOCUMENTS

| | | | |
|---|---|---|---|
| 10,372,618 | B2 | 8/2019 | Dooley et al. |
| 10,509,736 | B2 | 12/2019 | Raval et al. |
| 10,528,480 | B2 | 1/2020 | Lal et al. |
| 10,545,877 | B2 | 1/2020 | Raja et al. |
| 10,552,338 | B2 | 2/2020 | Abhishek et al. |
| 10,846,239 | B2 | 11/2020 | Mukherjee et al. |
| 2006/0149919 | A1 | 7/2006 | Arizpe et al. |
| 2006/0277390 | A1 | 12/2006 | Zuraski et al. |
| 2009/0157968 | A1* | 6/2009 | Bell ............ G06F 12/0864 711/E12.017 |
| 2018/0046579 | A1* | 2/2018 | Greenspan ............ G06F 12/123 |
| 2018/0137069 | A1 | 5/2018 | Vakharwala et al. |
| 2019/0213140 | A1* | 7/2019 | Cooray ............ G06F 12/1009 |
| 2020/0218665 | A1 | 7/2020 | Swaine |
| 2020/0278935 | A1 | 9/2020 | Borikar et al. |
| 2021/0157725 | A1 | 5/2021 | Barbalho et al. |
| 2021/0271606 | A1* | 9/2021 | Hensley ............ G06F 12/084 |

OTHER PUBLICATIONS

Y. Pan, Y. Li, H. Zhang, H. Chen and M. Lin, "GFTL: Group-Level Mapping in Flash Translation Layer to Provide Efficient Address Translation for NAND Flash-Based SSDs," in IEEE Transactions on Consumer Electronics, vol. 66, No. 3, pp. 242-250, Aug. 2020.*
C. J. Janraj, T. V. Kalyan, T. Warrier and M. Mutyam, "Way Sharing Set Associative Cache Architecture," 2012 25th International Conference on VLSI Design, Hyderabad, India, 2012, pp. 251-256.*
E. G. Hallnor and S. K. Reinhardt, "A fully associative software-managed cache design," Proceedings of 27th International Symposium on Computer Architecture (IEEE Cat. No. RS00201), Vancouver, BC, Canada, 2000, pp. 107-116.*
M. D. Hill, "A case for direct-mapped caches," in Computer, vol. 21, No. 12, pp. 25-40, Dec. 1988.*
Extended European Search Report dated Apr. 26, 2023 from the European Patent Office for corresponding European Patent Application No. 22203192.4.
Seznec A, "Concurrent Support of Multiple Page Sizes on a Skewed Associative TLB", IEEE Transactions on Computers, IEEE, USA, vol. 53, No. 7, Jul. 1, 2004 (Jul. 1, 2004), pp. 924-927.

* cited by examiner

FIG. 3

CPI

| CACHE | PAGE SIZE |
|---|---|
| FPGC1 | 4KB |
| FPGC2 | 8KB |
| FPGC3 | 16KB |
| FPGC4 | 32KB |
| FPGC5 | 64KB |
| FPGC6 | 4KB |
| FPGC7 | NA |
| ⋮ | ⋮ |
| FPGCn | NA |

FIG. 6

| TE | V | PFID | TG | PA | OINF |

FIG. 7

| | | ADDRESS BITS | | | | | | | | | | | | | | | | | | | | |
|---|---|---|---|---|---|---|---|---|---|---|---|---|---|---|---|---|---|---|---|---|---|---|
| PAGE SIZE | S | 63:32 | 31 | 30 | 29 | 28 | 27 | 26 | 25 | 24 | 23 | 22 | 21 | 20 | 19 | 18 | 17 | 16 | 15 | 14 | 13 | 12 |
| 4KB | 0 | X | X | X | X | X | X | X | X | X | X | X | X | X | X | X | X | X | X | X | X | X |
| 8KB | 1 | X | X | X | X | X | X | X | X | X | X | X | X | X | X | X | X | X | X | X | X | 0 |
| 16KB | 1 | X | X | X | X | X | X | X | X | X | X | X | X | X | X | X | X | X | X | X | 0 | 1 |
| 2MB | 1 | X | X | X | 0 | X | X | X | X | X | X | X | X | 0 | 1 | 1 | 1 | 1 | 1 | 1 | 1 | 1 |
| 1GB | 1 | X | 0 | X | 1 | 1 | 1 | 1 | 1 | 1 | 1 | 1 | 1 | 1 | 1 | 1 | 1 | 1 | 1 | 1 | 1 | 1 |
| 4GB | 1 | X | 0 | 1 | 1 | 1 | 1 | 1 | 1 | 1 | 1 | 1 | 1 | 1 | 1 | 1 | 1 | 1 | 1 | 1 | 1 | 1 |

ADDRESS TRANSLATION CACHE AND SYSTEM INCLUDING THE SAME

CROSS-REFERENCE TO RELATED APPLICATION

This U.S. non-provisional application claims priority under 35 USC § 119 to Korean Patent Application No. 10-2021-0169763, filed on Dec. 1, 2021 in the Korean Intellectual Property Office (KIPO), and Korean Patent Application No. 10-2022-0063986, filed on May 25, 2022 in the KIPO, the disclosures of which are incorporated by reference herein in their entirety.

BACKGROUND

1. Technical Field

Example embodiments relate generally to semiconductor integrated circuits, and more particularly to an address translation cache and a system including an address translation cache.

2. Discussion of the Related Art

Data processing systems or computing systems perform access to a memory device through address translation to convert a virtual address to a physical address of the memory device. Intellectual properties (IPs) (i.e., functional circuitries or blocks) having various functions may be included in, or implemented by, a computing system. Some IPs are able to perform a function of direct access to a memory device, and an IP having the function of direct access may be referred to as a direct memory access device. The direct memory access device may transfer data to and/or from a memory device without passing through a processor (e.g., a central processing unit (CPU)). To prevent the memory collision by a host device and various direct memory access devices, a memory management unit (MMU) or a translation agent (TA) may manage a mapping table or a page table including mapping information between the virtual address and the physical address of the memory device.

The host device of the memory management unit may include a translation look aside buffer (TLB) to further enhance the speed and the efficiency of the address translation. The TLB may store the address mapping information referenced recently and/or frequently. The TLB included in the direct memory access device may be referred to as an address translation cache (ATC) that is differentiated from the processor TLB used by the host device.

In general, the address translation is performed by units of page, and the page size may be determined variously. The ATC is implemented with a fully associative cache to store mapping information corresponding to various page sizes. However, when the ATC is implemented with the fully associative cache, the size of the direct memory access device is increased and the speed of the address translation is reduced.

SUMMARY

Some example embodiments may provide an address translation cache capable of efficiently performing address translation and a system including the address translation.

According to example embodiments, an address translation cache (ATC) is configured to store translation entries indicating mapping information between a virtual address and a physical address of a memory device. The ATC includes a plurality flexible page group caches, a shared cache and a cache manager. Each flexible page group cache stores translation entries corresponding to a page size allocated to the flexible group cache. The shared cache stores, regardless of page sizes, translation entries that are not stored in the plurality of flexible page group caches. The cache manager allocates a page size to each flexible page group cache, manages cache page information on the page sizes allocated to the plurality of flexible page group caches, and controls the plurality of flexible page group caches and the shared cache based on the cache page information.

According to example embodiments, an ATC is configured to store translation entries indicating mapping information between a virtual address and a physical address of a memory device. The ATC includes a plurality of function-dedicated caches dedicated to a plurality of functions and implemented with a plurality of fully associative caches, each function-dedicated cache is configured to store translation entries related with a respective function, a plurality of flexible page group caches implemented with a plurality of set associative caches, each flexible page group cache configured to store translation entries corresponding to a page size allocated to the flexible group cache and not stored in the plurality of function-dedicated caches, a shared cache implemented with a fully associative cache, the shared cache configured to store, regardless of page sizes, translation entries that are not stored in the plurality of function-dedicated caches or the plurality of flexible page group caches, and a cache manager configured to allocate the page size to each flexible page group cache, manage cache page information on the page sizes allocated to the plurality of flexible page group caches, and control the plurality of flexible page group caches and the shared cache based on the cache page information.

According to example embodiments, a system includes a host memory device, a host processor, a direct memory access device configured to perform a direct memory access to the host memory access, the direct memory access device including an ATC configured to store translation entries indicating mapping information between a virtual address of the host processor and a physical address of a memory device, and a memory management unit configured to manage access of the host processor and the direct memory access device to the host memory device. The ATC includes a plurality of flexible page group caches, each flexible page group cache configured to store translation entries corresponding to a page size allocated to the flexible group cache, a shared cache configured to store, regardless of page sizes, translation entries that are not stored in the plurality of flexible page group caches, and a cache manager configured to allocate the page size to each flexible page group cache, manage cache page information on the page sizes allocated to the plurality of flexible page group caches, and control the plurality of flexible page group caches and the shared cache based on the cache page information.

The address translation cache according to example embodiments may efficiently utilize the cache memory resources and reduce the search time for the address mapping information, by dynamically allocating the page sizes to the plurality of flexible page group caches and storing the translation entries per page size based on the allocated page sizes.

BRIEF DESCRIPTION OF THE DRAWINGS

Example embodiments of the present disclosure will be more clearly understood from the following detailed description taken in conjunction with the accompanying drawings.

FIG. 3 is a diagram illustrating example cache page information of an address translation cache according to example embodiments.

FIG. 6 is a diagram illustrating an example translation entry stored in a cache line of an address translation cache according to example embodiments.

FIG. 7 is a diagram illustrating an example of setting address bits according to page sizes.

DETAILED DESCRIPTION OF THE EMBODIMENTS

Figure 1:
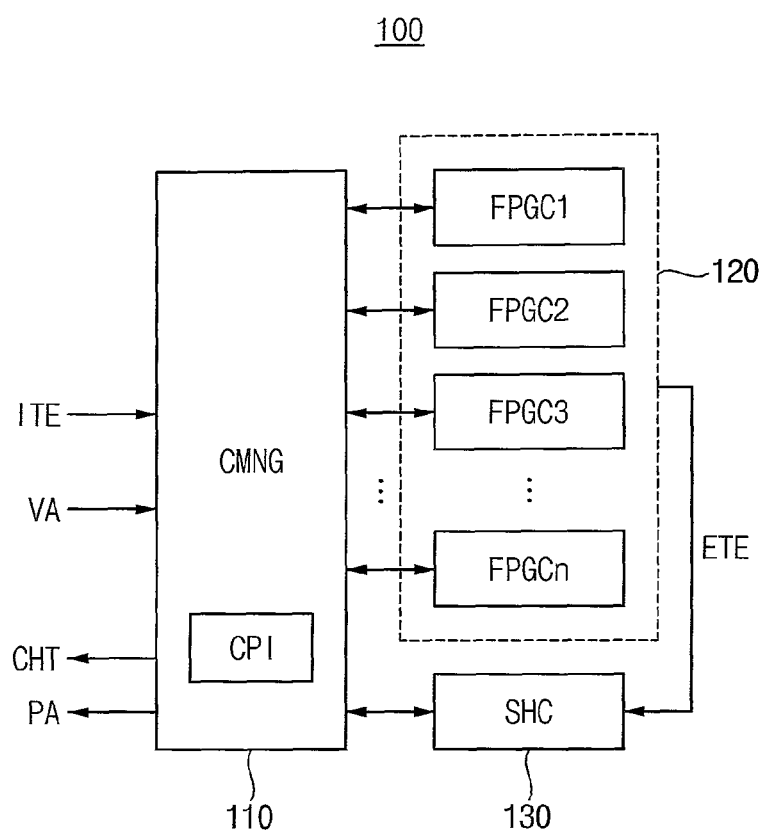
FIG. 1 is a block diagram illustrating an address translation cache according to example embodiments.

Various example embodiments will be described more fully hereinafter with reference to the accompanying drawings, in which some example embodiments are shown. In the drawings, like numerals refer to like elements throughout. The repeated descriptions may be omitted.

Figure 2:
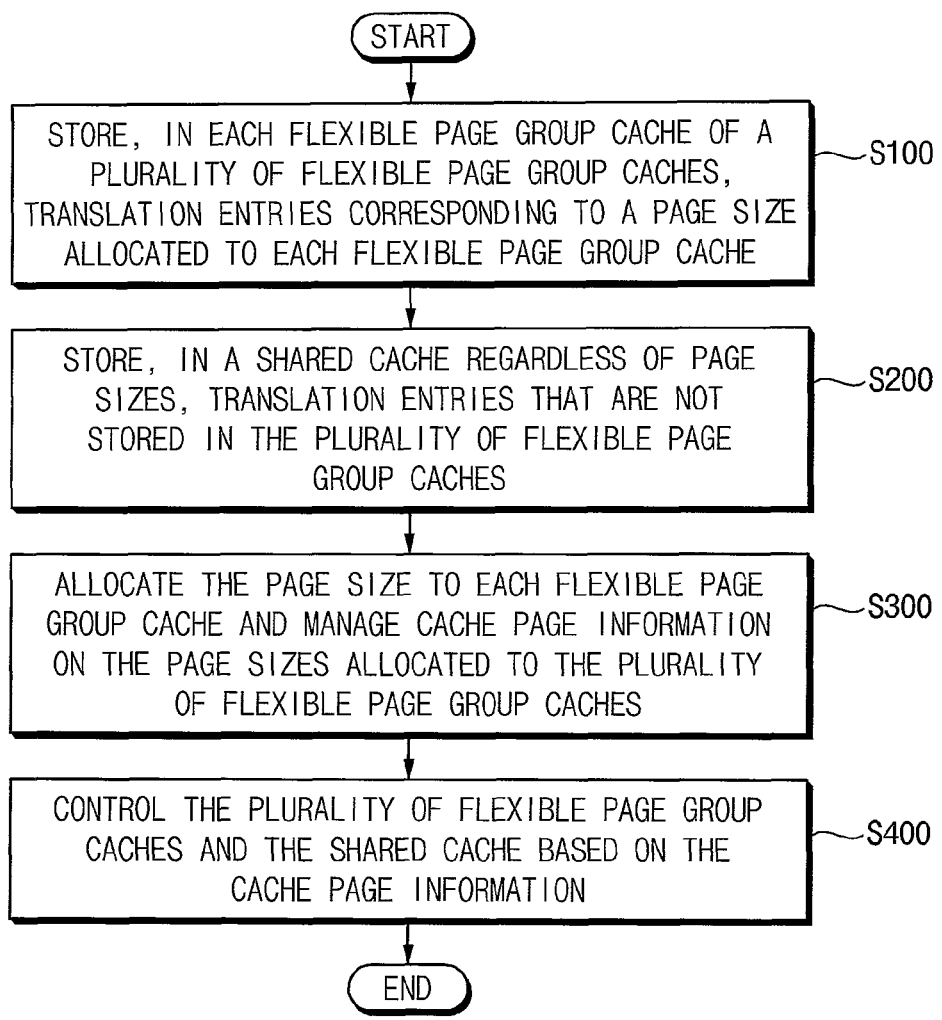
FIG. 2 is a flowchart illustrating a method of operating an address translation cache according to example embodiments.

FIG. 1 is a block diagram illustrating an address translation cache according to example embodiments, and FIG. 2 is a flowchart illustrating a method of operating an address translation cache according to example embodiments.

Referring to FIG. 1, an address translation cache (ATC) 100 may include a cache manager CMNG 110, a plurality of flexible page group caches FPGC1~FPGCn 120 and a shared cache SHC 130. The ATC 100 stores translation entries indicating mapping information between a virtual address and a physical address of a memory device.

Referring to FIGS. 1 and 2, each flexible page group cache of the plurality of flexible page group caches 120 may store translation entries corresponding to a page size allocated to each flexible page group cache (S100). For example, each flexible page group cache may be designated to store translation entries having a particular page size.

The shared cache 130 may store translation entries that are not stored in the plurality of flexible page group caches 120, regardless of page sizes (S200).

The cache manager 110 may allocate the page size to each flexible page group cache and manage cache page information CPI on the page sizes allocated to the plurality of flexible page group caches 120 (S300).

The cache manager 130 may control the plurality of flexible page group caches 120 and the shared cache 130 based on the cache page information CPI (S400).

Operations of the ATC 100 may include an entry writing operation, an entry searching operation and an entry invalidating operation.

In the entry writing operation, the cache manager 110 may store an input translation entry ITE in either one of the plurality of flexible page group caches 120 or the shared cache 130. An evicted translation entry ETE that is evicted from the plurality of flexible page group caches 120 may be stored in the shared cache 130. Example embodiments of the entry writing operation will be described with reference to FIG. 4.

In the entry searching operation, the cache manager 110 may determine a cache hit or cache miss, that is, whether the translation entry corresponding to an input virtual address VA exists in the plurality of flexible page group caches 120 or the shared cache 130. The cache manager 110 may activate a cache hit signal CHT in case of the cache hit and provide a physical address PA of the translation entry corresponding to the input virtual address VA. The cache manager 110 may deactivate the cache hit signal CHT in case of the cache miss. Example embodiments of the entry searching operation will be described with reference to FIGS. 8 and 9.

In the entry invalidating operation, the cache manager 110 may search for and delete the translation entry corresponding to the input virtual address VA in the plurality of flexible page group caches 120 and the shared cache 130. Example embodiments of the entry invalidating operation will be described with reference to FIG. 10.

In some example embodiments, the plurality of flexible page group caches may be implemented with a plurality of set associative caches and the shared cache may be implemented with a fully associative cache.

A set associative cache may include a plurality of sets and each set may include a plurality of cache lines respectively pertaining to a plurality of ways. Each "way" may refer to a group of cache lines respectively pertaining to the plurality of sets. A set associative cache including only one way (e.g., one cache line per set) may be referred to as a direct-mapped cache. The set associative cache may determine a set based on an index corresponding to one portion of address bits of the virtual address VA and determine the cache hit based on a tag corresponding to the other portion of the address bits. The set associative cache will be further described with reference to FIG. 5.

Whereas the set associative cache includes a plurality of sets such that each set may include one or more cache lines, a fully associative cache includes a plurality of cache lines that are not corresponding to any set (e.g., there is only one set for the entire group of cache lines). Therefore the fully associative cache does not use the index for determining the corresponding set, and stores all address bits as the tag.

The fully associative cache may efficiently utilize the cache memory resources because the fully associative cache does not designate the cache line in which the translation entry is to be stored. However, the hardware structure may be complex and the power consumption may be increased because the fully associative cache has to search all of the cache lines in the entry searching operation.

In contrast, the efficient utilization of the cache memory resources may be limited and probability of cache miss may be increased in case of the set associative cache because the set associative cache designates the set to which the translation entry is to be stored. However the set associative cache may have the relatively simple hardware structure and reduce the power consumption and the search time because the set associative cache search the particular set in the entry searching operation.

According to example embodiments, the performance of the ATC 100 may be enhanced with the efficient utilization of the cache memory resources, by implementing the plurality of flexible page group caches 120 with set associative caches and implementing the shared cache 130 with a fully associative cache.

FIG. 3 is a diagram illustrating example cache page information of an address translation cache according to example embodiments.

FIG. 3 illustrates an example of the cache page information CPI that is managed by the cache manager 110. For example, the page size of 4 KB may be allocated to a first flexible page group cache FPGC1, the page size of 8 KB may be allocated to a second flexible page group cache FPGC2, the page size of 16 KB may be allocated to a third flexible page group cache FPGC3, the page size of 32 KB may be allocated to a fourth flexible page group cache FPGC4, the page size of 64 KB may be allocated to a fifth flexible page group cache FPGC5, and the page size of 4 kB may be allocated to a sixth flexible page group cache FPGC6. Sixth through n-th flexible page group caches FPGC7~FPGCn may be in an unallocated state NA for which the page size is not allocated yet. For example, the same page size (e.g., 4 KB) may be allocated to the two or more flexible page group caches (e.g., FPGC1 and FPGC6). When all of the translation entries in the translation entry to which the page size is allocated are invalidated, the allocation of the page size may be canceled and the flexible page group cache may be return to the unallocated state NA.

As such, the address translation cache 100 according to example embodiments may efficiently utilize the cache memory resources and reduce the search time for the address mapping information, by dynamically allocating the page sizes to the plurality of flexible page group caches 120 and storing the translation entries per page size based on the allocated page sizes, described generally as the cache page information CPI.

Figure 4:
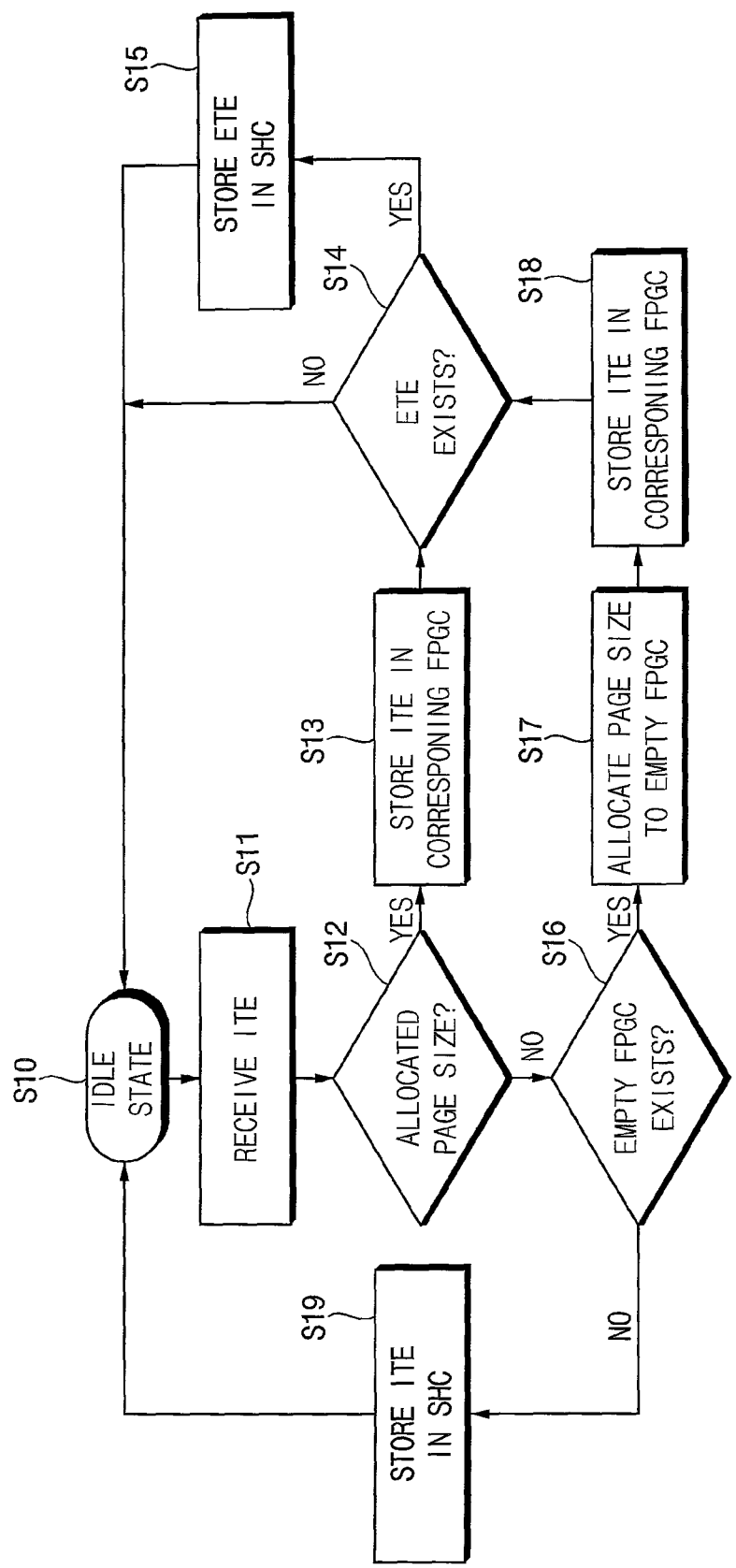
FIG. 4 is a flowchart illustrating an example embodiment of an entry write operation of an address translation cache according to example embodiments.

FIG. 4 is a flowchart illustrating an example embodiment of an entry write operation of an address translation cache according to example embodiments.

Referring to FIGS. 1 and 4, the cache manager 110 may receive an input translation entry ITE (S11) during an idle state S10.

The cache manager 110 may determine whether the page size corresponding to the input translation entry ITE is identical to one of the page sizes allocated to the plurality of flexible page group caches 120 (S12). For example, the cache manager 110 may determine the page size corresponding to the input translation entry ITE based on address bits as will be described below with reference to FIG. 7. The cache manager 110 may determine whether the page size corresponding to the input translation entry ITE corresponds to the assigned page size based on cache page information CPI.

When the cache manager 110 receives the input translation entry ITE corresponding to the page size that is identical to one of the page sizes allocated to the plurality of flexible page group caches 120 (S12: YES), the cache manager 110 may store the input translation entry ITE in the corresponding flexible page group cache (FPGC) to which the page size corresponding to the input translation entry ITE is allocated (S13).

When there exists an evicted translation entry ETE that is evicted from the plurality of flexible page group caches 120 (S14: YES), the cache manager 110 may store the evicted translation entry ETE in the shared cache SHC (S15), and then return to the idle state (S10). When an evicted translation entry ETE does not exist (S14: NO), the cache manager 110 may return to the idle state (S10).

When the cache manager 110 receives an input translation entry ITE corresponding to a new page size that is different from the page sizes allocated to the plurality of flexible page group caches 120 (S12: NO), the cache manager 110 may determine whether there exists an empty flexible page group cache among the plurality of flexible page group caches 120 to which the page size is not allocated (S16).

When the empty flexible page group cache exists (S16: YES), the cache manager 110 may allocate the new page size corresponding to the input translation entry ITE to the empty flexible page group cache (S17) and store the input translation entry ITE in the corresponding flexible page group cache to which the new page size is allocated (S18).

When the empty flexible page group cache does not exist (S16: NO), the cache manager 110 may store the input translation entry ITE in the shared cache SHC and return to the idle state (S10).

As such, the address translation cache 100 according to example embodiments may efficiently utilize the cache memory resources and reduce the search time for the address mapping information, by dynamically allocating the page sizes to the plurality of flexible page group caches 120 and storing the translation entries per page size based on the allocated page sizes, that is, the cache page information CPI.

The cache manager 110, and other example cache managers in other embodiments can include hardware, firmware, and software configured to perform the various tasks described herein. For example, the cache manager 110 may include one or more of the following components: at least one processor, such as a logic device or central processing unit (CPU), configured to execute computer program instructions to perform the various processes and methods described herein, random access memory (RAM) and read only memory (ROM) configured to access and store data and information and computer program instructions, and storage media or other suitable type of memory (e.g., such as, for example, RAM, ROM, programmable read-only memory (PROM), erasable programmable read-only memory (EPROM), electrically erasable programmable read-only memory (EEPROM), or other type of tangible and non-transitory storage medium) where data and/or instructions can be stored. In addition, the cache manager 110 can include connections to a power source that provides an appropriate alternating current (AC) or direct current (DC) to power one or more components of the cache manager 110, and a bus that allows communication among the various disclosed components of the cache manager 110. Controllable functions of the cache manager 110 can be set using one or more input devices, such as a keyboard, mouse, touch screen, etc.

Figure 5:
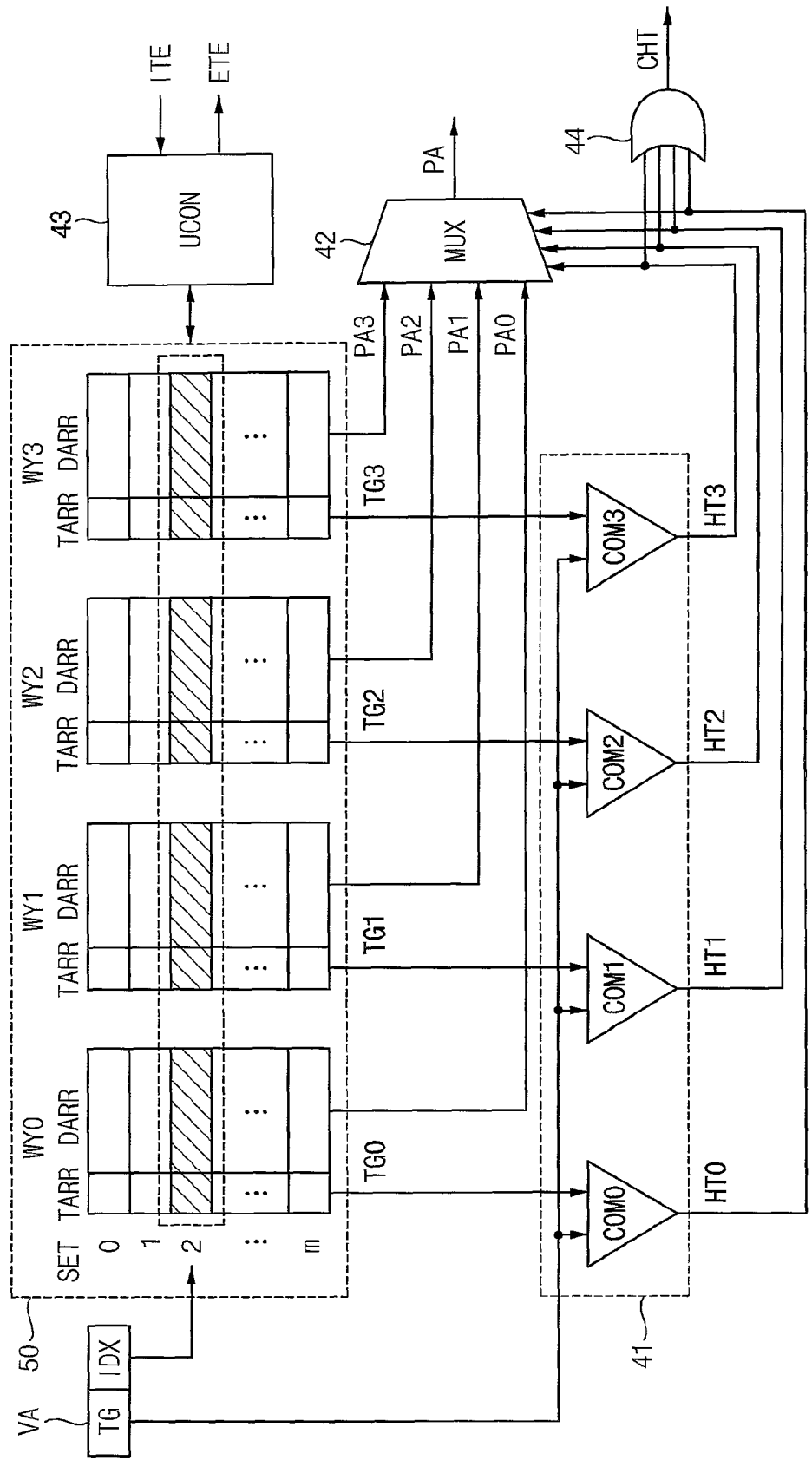
FIG. 5 is a diagram illustrating an example embodiment of a set associative cache included in an address translation cache according to example embodiments.

FIG. 5 is a diagram illustrating an example embodiment of a set associative cache included in an address translation cache according to example embodiments.

Referring to FIG. 5, a set associative cache 20 may include a cache memory 50, a tag comparison circuit 41, a data output circuit MUX 42, an update controller UCON 43, and a cache hit determination circuit 44.

The cache memory 50 may include a tag memory TARR region (e.g., tag memory TARR cells) to store a tag of a virtual address VA and a data memory DARR region (e.g., data memory DARR cells) to store a physical address PA mapped to the virtual address VA.

FIG. 5 illustrates an example of a set associative cache structure having four ways. The tag memory TARR and the data memory DARR may include a plurality of ways and a plurality of sets such that each set may be selected based on an index IDX of the virtual address VA. Each way may include a plurality of cache lines such that each cache line may store an individual translation entry. The row of the tag memory TARR and the data memory DARR indicates the set, and the column of the tag memory TARR and the data memory DARR indicates the way.

FIG. 5 illustrates the 4-way set-associated cache structure implemented with m+1 sets designated by indices from 0 to m and four ways WY0~WY3. As illustrated in FIG. 5, one set may store first through fourth tags TG0~TG3 and first through fourth physical addresses PA0~PA3 respectively mapped to the first through fourth tags TG0~TG3.

Additionally, the first through fourth tags TG0~TG3 may be stored in the same row of the tag memory TARR. The first tag data TG0 corresponds to the first way WY0, the second tag data TG1 corresponds to the second way WY1, the third tag data TG2 corresponds to the third way WY2, and the fourth tag data TG3 corresponds to the fourth way WY3. The first through fourth physical address PA0~PA3 respectively corresponding to the first through fourth tags TG0~TG3 may be stored in the data memory DARR in the same manner as the first through fourth tags TG0~TG3.

The set associative cache 20 receives the input virtual address VA for address translation from an external device. The input virtual address VA, as illustrated in FIG. 5, includes the tag TG and the index IDX. The index IDX indicates a row address of the cache memory 50. In other words, the index IDX indicates one set of a plurality of sets included in the cache memory 50.

The tag comparison circuit 41 and the cache hit determination circuit 44 may receive the tag TG of the input virtual address VA for address translation and determine whether the translation entry corresponding to the input virtual address VA is stored in the cache memory 50. In other words, the tag comparison circuit 41 and the cache hit determination circuit 44 may determine whether there is a cache hit or a cache miss.

The tag comparison circuit 41 may include comparators COM0~COM3 to compare each of the tags TG0~TG3 stored in and read from the set corresponding to the index IDX of the input virtual address VA with the tag TG of the input virtual address VA. The comparators COM0~COM3 may activate way hit signals HT0~HT3, respectively, when a corresponding one of the first through fourth tags coincides with the tag TG. The cache hit determination circuit 44 may activate the cache hit signal CHT to indicate the cache hit when at least one of the way hit signals HT0~HT3 is activated. For example, the cache hit indicates that the mapping information that is externally requested exists in the cache memory 50.

When the cache hit signal CHT is activated to indicate the cache hit, the physical address PA corresponding to the tag TG of the input virtual address VA may be output. The tag comparison circuit 41 outputs the way hit signals HT0~HT3 to the data output circuit 42, and the data output circuit 42 may select one of the physical addresses PA0~PA3, corresponding to the activated way hit signal, to output the selected physical address PA. In contrast, in case of the cache miss, the cache hit determination circuit 44 may deactivate the cache hit signal CHT to indicate the cache miss. In case of the cache miss, the ATC 100 may request the physical address PA corresponding to the input virtual address VA to the memory management unit as will be described below with reference to FIGS. 14 and 15.

Information previously stored in one of the cache lines may be evicted to make room for the new information if all of the cache lines are currently storing information. Cache lines are selected for eviction based on a cache replacement policy. For example, the cache replacement policy may be based on least recently used (LRU) policy or re-reference interval prediction (RRIP) policy.

The update controller 43 may delete the cache data corresponding to the evicted translation entry ETE from the one cache line, which may be determined by the cache replacement policy, and store the received input translation entry ITE in the cache line in which the evicted translation entry ETE has been stored.

FIG. 6 is a diagram illustrating an example translation entry stored in a cache line of an address translation cache according to example embodiments.

Referring to FIG. 6, a translation entry TE may include a tag TG of a virtual address and a physical address PA mapped to the tag TG. In addition, the translation entry TE may further include a validity field V, a function identifier PFID and other information OINF. The validity field V may indicate validness or invalidness of the translation entry TE and the function identifier PFID may indicate may indicate a function related with the translation entry TE among a plurality of functions. The other information OINF may include LRU field for determining the evicted translation entry ETE, a lock count field indicating a number of outstanding instructions related with the translation entry TE, and so on.

FIG. 7 is a diagram illustrating an example of setting address bits according to page sizes.

FIG. 7 illustrates an example of setting a page size using s-field according to a peripheral component interconnect express (PCIe) standard. In FIG. 7, "X" indicates a bit value of 0 or 1 that is determined by a real address.

For example, the minimum page size may be 4 KB, and in this case the bits 0-10 may be neglected. The bit 11 corresponds to the s-field. The value of 0 of the s-field may indicate that the minimum page size is applied, and the value of 1 of the s-field may indicate that the page size larger than the minimum page size is applied. The value of 0 of the bit 12 may indicate that the page size of 8 KB is applied and the value of 1 of the bit 12 may indicate that the page size larger than 8 KB is applied. In this way, the page size of the address may be determined by determining the first bit having the value of 0 starting from the s-field. FIG. 7 illustrates the address bits corresponding to the page size of 4 KB, 8 KB, 2 MB, 1 GB and 4 GB. The higher bits 32~63 may be used to indicate the page sizes larger than 4 GB.

Figure 8:
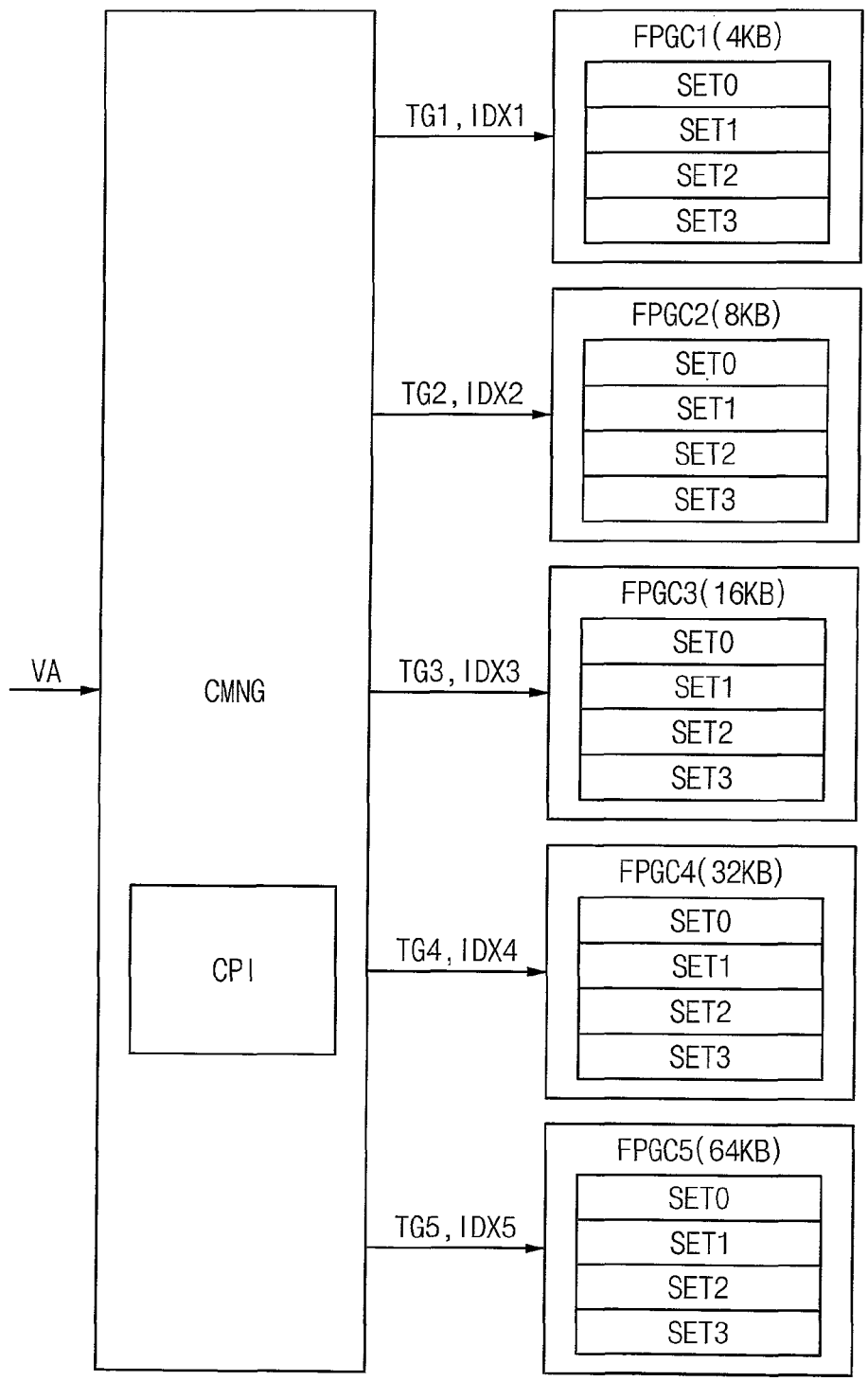
FIGS. 8 and 9 are diagrams illustrating an example embodiment of an entry search operation of an address translation cache according to example embodiments.
Figure 9:
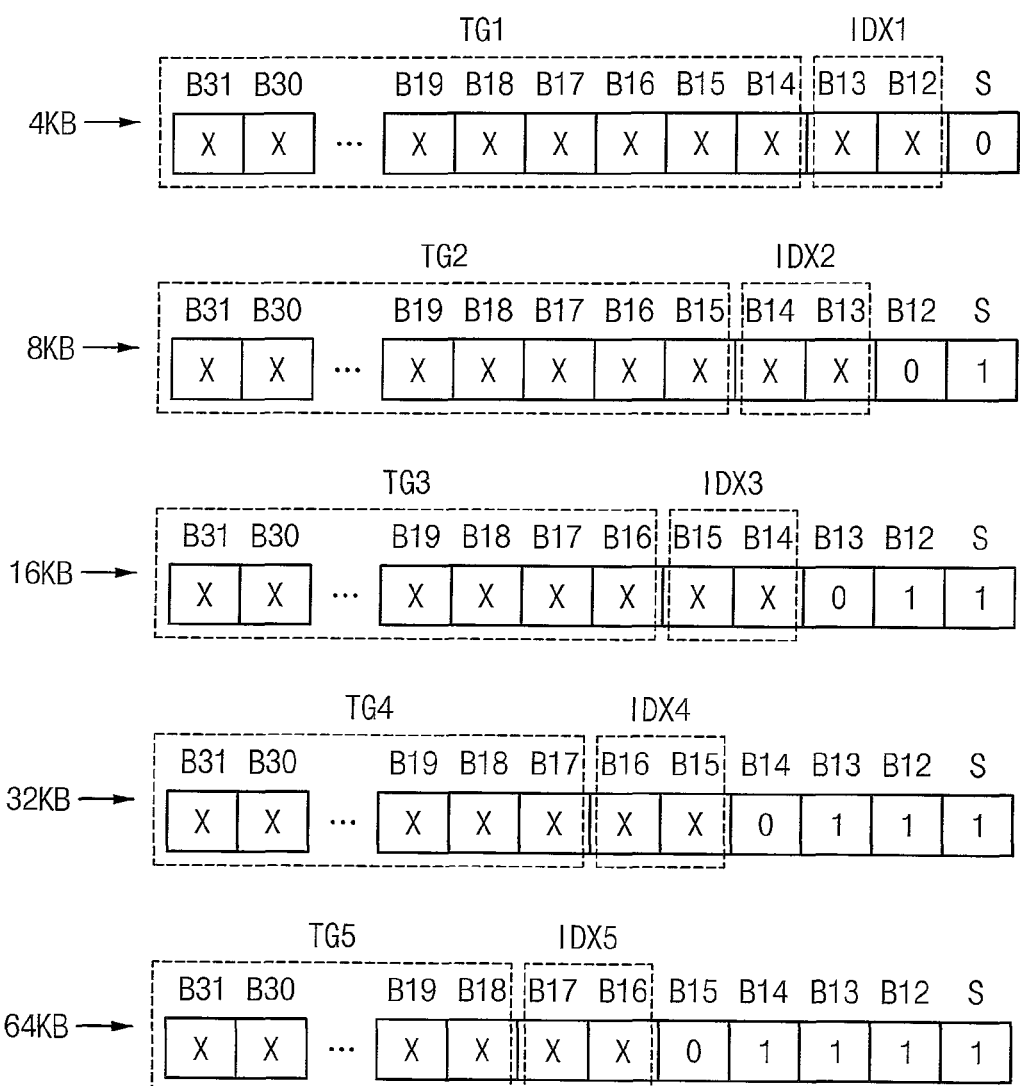

FIGS. 8 and 9 are diagrams illustrating an example embodiment of an entry search operation of an address translation cache according to example embodiments.

For convenience of illustration, FIG. 8 illustrates first through fifth set associative caches FPGC1~FPGC4 corresponding to a plurality of flexible page group caches and a cache manager CMNG, and the above-described shared cache SHC is omitted in FIG. 8.

Referring to FIG. 8, the page size of 4 KB may be allocated to the first set associative cache FPGC1, the page size of 8 KB may be allocated to the second set associative cache FPGC2, the page size of 16 KB may be allocated to the third set associative cache FPGC3, the page size of 32 KB may be allocated to the fourth set associative cache FPGC4, and the page size of 64 KB may be allocated to the fifth set associative cache FPGC5. Example embodiments are not limited to setting of the page sizes illustrated in FIG. 8, and the cache manager CMNG may allocate the page sizes variously and/or dynamically. The allocated page sizes may be stored as the cache page information CPI.

In some example embodiments, the first through fifth set associative caches FPGC1~FPGC5 may include the same number of sets. For example, as illustrated in FIG. 8, each set associative cache may include four sets SET0~SET3, and in this case the two bits of the virtual address VA may correspond to the index IDX.

When the cache manager CMNG searches for the physical address PA mapped to the input virtual address VA, the cache manager CMNG may search all of the first through fifth set associative caches FPGC1~FPGC5 corresponding to the plurality of flexible page group caches and the fully associative cache (not shown in FIG. 8) corresponding to the shared cache SHC.

FIG. 9 illustrates an example of setting of address bits according to the page sizes as described above with reference to FIG. 7.

Referring to FIGS. 8 and 9, the cache manager CMNG may extract, from the input virtual address VA, first through fifth tags TG1~TG5 and first through fifth indexes IDX1~IDX5 corresponding to the page sizes 4 KB, 8 KB, 16 KB, 32 KB and 64 KB allocated to the first through fifth set associative caches FPGC1~FPGC5 based on the cache page information CPI, and provide the tags and indexes respectively to the corresponding set associative caches. Even though not illustrated, the input virtual address VA may be provided to the shared cache SHC implemented with the fully associative cache.

As illustrated in FIG. 9, the tag and the index may be changed depending on the page size. In case of the page size of 4 KB, the first index IDX1 may correspond to the address bits B12 and B13, and the first tag TG1 may correspond to the address bits B14~B31. In case of the page size of 8 KB, the second index IDX2 may correspond to the address bits B13 and B14, and the second tag TG2 may correspond to the address bits B15~B31. In case of the page size of 16 KB, the third index IDX3 may correspond to the address bits B14 and B15, and the third tag TG3 may correspond to the address bits B16~B31. In case of the page size of 32 KB, the fourth index IDX4 may correspond to the address bits B15 and B16, and the fourth tag TG4 may correspond to the address bits B17~B31. In case of the page size of 64 KB, the fifth index IDX5 may correspond to the address bits B16 and B17, and the fifth tag TG5 may correspond to the address bits B18~B31.

As such, when the first through fifth set associative caches FPGC1~FPGC5 include the same number of sets SET0~SET3, the number of bits of each tag stored in each set associative cache may be decreased as the page size allocated to each set associative cache is increased.

In the aspect of a device including the address translation cache, the page size managed by the memory management unit may be determined after the device receives a translation response as will be described below with reference to FIGS. 14 and 15. The page size may be varied per function and/or translation response, and thus the particular page size may not be allocated to the set associative cache in advance.

In addition, the location of the index in the address bits may be varied depending on the page size, and the conventional address translation cache adopting the particular locations in the address bits as the index may not use the set associative cache instead of the fully associative cache.

As described with reference to FIGS. 8 and 9, according to example embodiments, the page size may be allocated dynamically to each set associative cache, and the tag and the index corresponding to the allocated page size may be extracted from the input virtual address VA based on the cache page information CPI and provided to each set associative cache.

Figure 10:
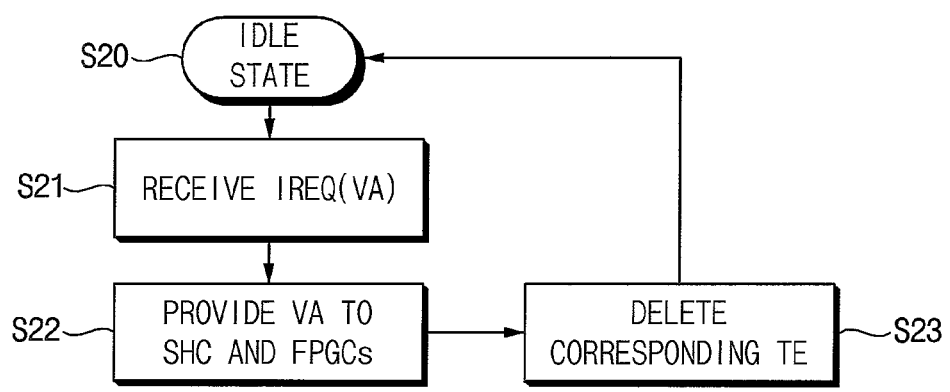
FIG. 10 is a flowchart illustrating an example embodiment of an entry invalidation operation of an address translation cache according to example embodiments.

FIG. 10 is a flowchart illustrating an example embodiment of an entry invalidation operation of an address translation cache according to example embodiments.

Referring to FIGS. 1 and 10, a device including the ATC 100 in an idle state (S20) may receive an invalidation request IREQ (S21) from an external device such as a host processor. The invalidation request IREQ may include the input virtual address VA indicating a translation entry to be invalidated.

All of the translation entries have to be searched to invalidate the translation entry overlapped with the invalidation range indicated by the invalidation request IREQ. Accordingly the cache manager CMNG may provide the input virtual address VA to all of the shared cache SHC and the flexible page group caches FPGCs (S22). As described above, the flexible page group caches FPGCs may be implemented with the set associative caches. In this case, the cache manager CMNG may provide the tags and the indexes corresponding to the allocated page sizes to the flexible page group caches, respectively, based on the cache page information CPI. The cache manager CMNG may provide the input virtual address VA to the shared cache SHC that is implemented with the fully associative cache.

As such, when the cache manager CMNG invalidates the translation entry corresponding to the input virtual address VA, the cache manager CMNG may search all of the plurality of flexible page group caches FPGCs and the shared cache SHC.

Each of the plurality of flexible page group caches FPGCs and the shared cache SHC may delete the translation entry TE corresponding to the input virtual address VA (S23). For example, the deletion or the invalidation of the translation entry TE may be performed by changing the value of the validity field V included in the translation entry TE as described above with reference to FIG. 6.

Figure 11:
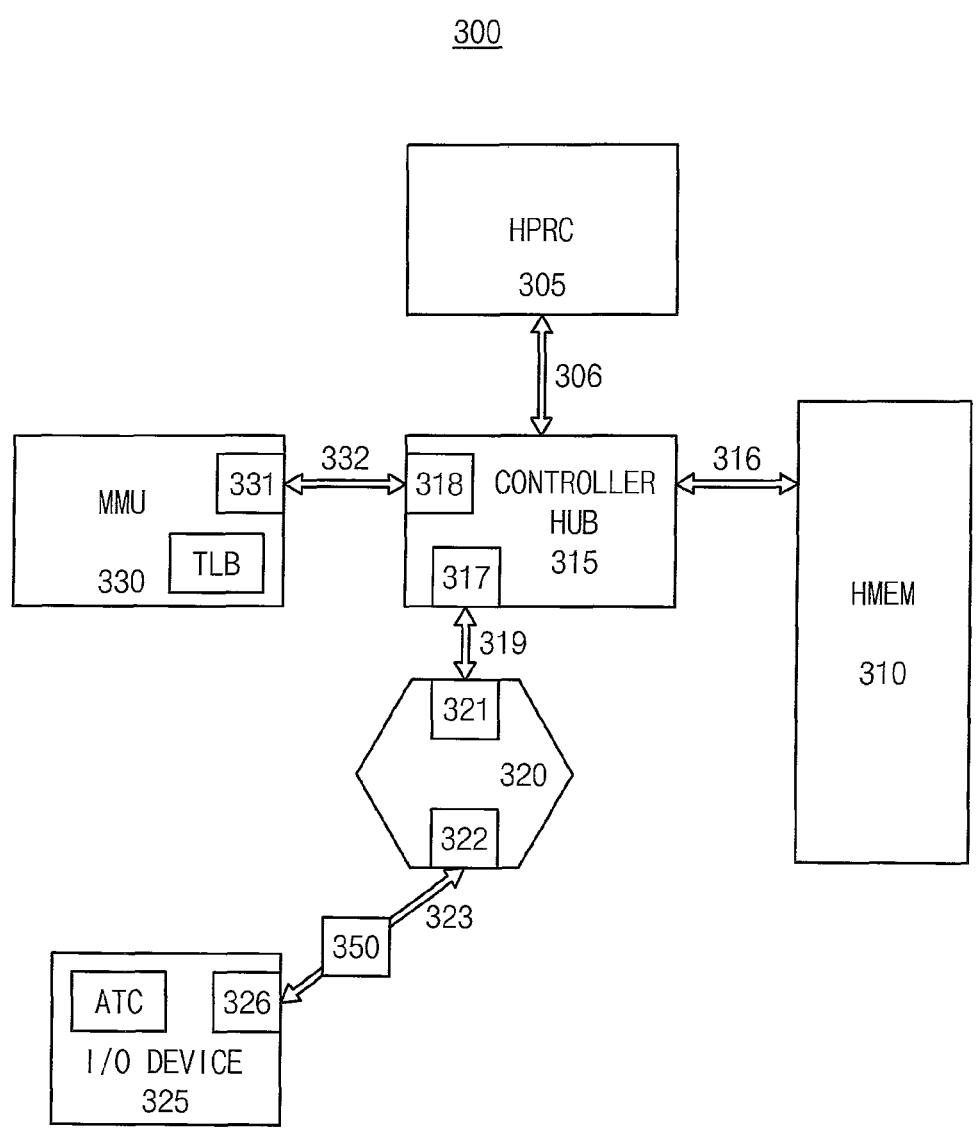
FIG. 11 is a block diagram illustrating an example embodiment of an interconnect architecture of a system including an address translation cache according to example embodiments.

FIG. 11 is a block diagram illustrating an example embodiment of an interconnect architecture of a system including an address translation cache according to example embodiments.

Referring to FIG. 11, an example embodiment of a design composed of point-to-point links that interconnect a set of components is illustrated. A system 300 includes host processor HPRC 305, a host memory device (or a system memory) HMEM 310 and a memory management unit MMU 330 coupled to a controller hub 315. The host processor 305 includes any processing element, such as a microprocessor, a host processor, an embedded processor, a co-processor, or other processor. The host processor 305 is coupled to the controller hub 315 through a front-side bus (FSB) 306. In one example embodiment, the FSB 306 is a serial point-to-point interconnect. In another example embodiment, the FSB 306 includes a serial, differential interconnect architecture that is compliant with a different interconnect standard.

The system memory 310 includes any memory device, such as random access memory (RAM), non-volatile (NV) memory, solid state memory, or other memory accessible by devices in the system 300. The system memory 310 is coupled to the controller hub 315 through a memory interface 316. Examples of a memory interface include a double-data rate (DDR) memory interface, a dual-channel DDR memory interface, and a dynamic RAM (DRAM) memory interface.

In one example embodiment, the controller hub 315 is a root hub, root complex, or root controller in a Peripheral Component Interconnect Express (PCIe or PCIE) interconnection hierarchy. Examples of the controller hub 315 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with the host processor 305, while the controller hub 315 is used to communicate with I/O devices, in a similar manner as described below. In some example embodiments, peer-to-peer routing is optionally supported through the root complex or the controller hub 315.

Here, the controller hub 315 is coupled to a switch/bridge 320 through a serial link 319. Input/output modules 317 and 321, which may also be referred to as interfaces/ports 317 and 321, include/implement a layered protocol stack to provide communication between the controller hub 315 and the switch 320. In one example embodiment, multiple devices are capable of being coupled to the switch 320.

The switch/bridge 320 routes packets/messages from a device 325 upstream, i.e. up a hierarchy towards a root complex, to the controller hub 315 and downstream, i.e. down a hierarchy away from a root controller, from the processor 305 or the system memory 310 to the device 325. The switch 320, in one example embodiment, is referred to as a logical assembly of multiple virtual PCI-to-PCI bridge devices. The device 325 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device, is referred to as an endpoint. Although not specifically shown, the device 325 may include a PCIe to PCI/PCI-X bridge to support legacy or other version PCI devices. Endpoint devices in PCIe are often classified as legacy, PCIe, or root complex integrated endpoints.

The memory management unit 330 is also coupled to the controller hub 315 through a serial link 332. The I/O modules 331 and 318 are used to implement a layered protocol stack to communicate between the memory management unit 330 and the controller hub 315.

The memory management unit 330 may include a translation look aside buffer (TLB) configured to store the address mapping information referenced recently and/or frequently. The device 325 may have the direct memory access function and include an address translation cache ATC according to example embodiments.

Figure 12:
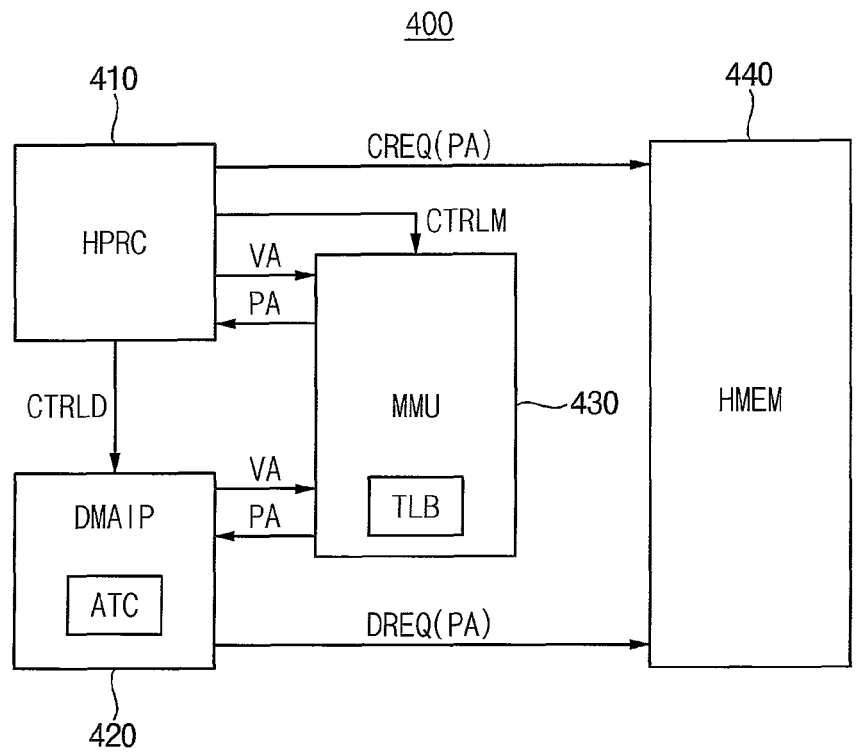
FIG. 12 is a block diagram illustrating a system including an address translation cache according to example embodiments.

FIG. 12 is a block diagram illustrating a system including an address translation cache according to example embodiments.

Referring to FIG. 12, a system 400 may include a host processor HPRC 410 (e.g., a CPU), a direct memory access device DMAIP 420, a memory management unit (or a memory management circuit) 430 and a host memory device 440.

The direct memory access device 420 and the memory management unit 430 may be controlled through control signals CTRLD and CTRLM generated by the host processor 410. The host memory device 440 may store data and program codes. Software program codes may be loaded in the host memory device 440 and the loaded software program codes may be executed by the host processor 410, and the host memory device 440 may function as a working memory of the system 400.

The host memory device 440 may be implemented with a volatile memory such as a dynamic random access memory (DRAM), a static random access memory (SRAM), etc., but example embodiments are not limited thereto. The host memory device 440 may be implemented with another type of volatile memory or a nonvolatile memory.

The direct memory access device 420 may be able to perform a function of direct memory access to the host memory device 440. For example, the direct memory access device 420 may be a camera, a graphics processing unit (GPU), a neural processing unit (NPU), a peripheral component interconnect express (PCIe) device, a universal flash storage (UFS) device, etc. FIG. 12 illustrates one direct memory access device for convenience of illustration and description, and example embodiments are not limited thereto. The system 400 may include a plurality of intellectual properties (i.e., functional blocks or functional circuits) having various functions, and two or more intellectual properties may be able to perform the function of direct memory access.

The direct memory access indicates a scheme to transfer data directly from one memory device to another memory device or directly between a memory device and an input-output device without passing through the host processor 410, which may be supported by an internal bus of the system 400.

Modes of the direct memory access may include a burst mode in which the direct memory access device 420 takes control of the internal bus from the host processor 410 to transfer data all at once, and a cycle steal mode in which the direct memory access device 420 accesses the host memory device 440 while the host processor 410 does not access the host memory device 440. The direct memory access is performed without intervention of the host processor 410. Accordingly performance of the system 400 may be enhanced because the host processor 410 may operate while the direct memory access is performed.

The memory management unit 430 may manage a core access of the host processor 410 to the host memory device 440 and a direct access of the direct memory access device 420 to the host memory device 440. The core access and the direct access may include a read operation to read data from the host memory device 440 and a write operation to store data to the host memory device 440. The core access may be performed based on a core access request CREQ issued by the host processor 410, and the direct access may be performed based on a direct access request DREQ issued by the direct memory access device 420.

Each of the core access request CREQ and the direct access request DREQ may include a virtual address VA for the read operation or the write operation. The memory management unit 430 may perform address translation to provide a physical address PA mapped to the virtual address VA. The virtual address VA indicates a position in a virtual address space of the operating system and the physical address PA indicates a real physical position of a memory region of the host memory device 440. Example embodiments of the address translation will be described below with reference to FIGS. 23 and 24.

The memory management unit 430 may include a translation look aside buffer (TLB) configured to store the address mapping information referenced recently and/or frequently. The direct memory access device 420 may include an address translation cache ATC according to example embodiments.

FIGS. 13 through 16 are diagrams illustrating operations of a system including an address translation cache according to example embodiments.

In some example embodiments, operations of FIGS. 13 through 16 may be performed according to an address translation service (ATS) and a page request interface (PRI) defined by the PCIe standard.

Figure 13:
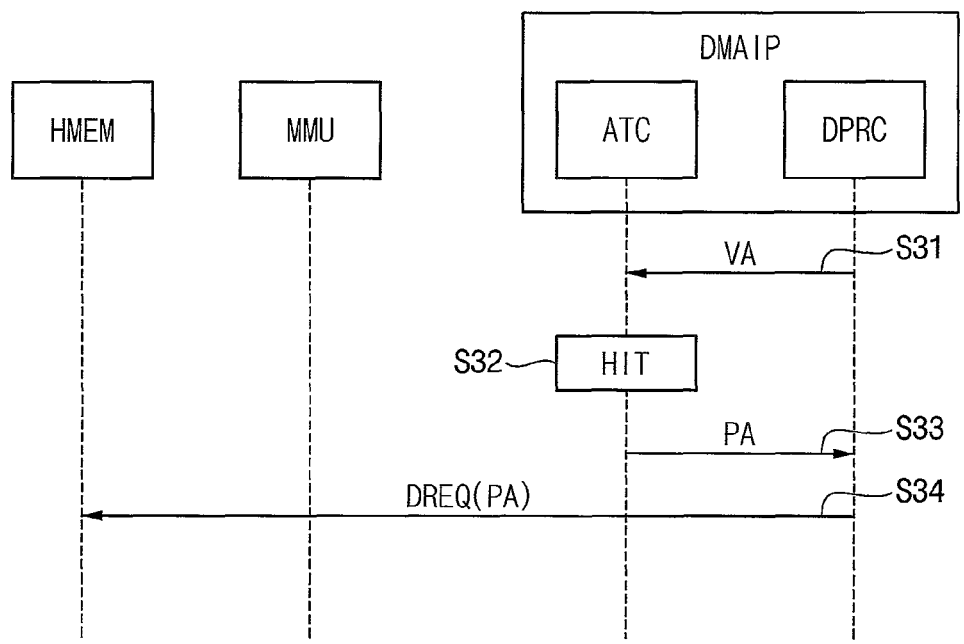
FIGS. 13 through 16 are diagrams illustrating operations of a system including an address translation cache according to example embodiments.

Referring to FIG. 13, a device processor DPRC in the direct memory access device DMAIP may transfer a virtual address VA to an ATC (S31). When a translation entry corresponding to the virtual address VA exists, that is, in case of cache hit (S32), the ATC may provide a physical address PA mapped to the virtual address VA to the device processor DPRC (S33). The device processor DPRC may transfer a direct access request DREQ including the physical address PA to the host memory device HMEM (S34).

Figure 14:
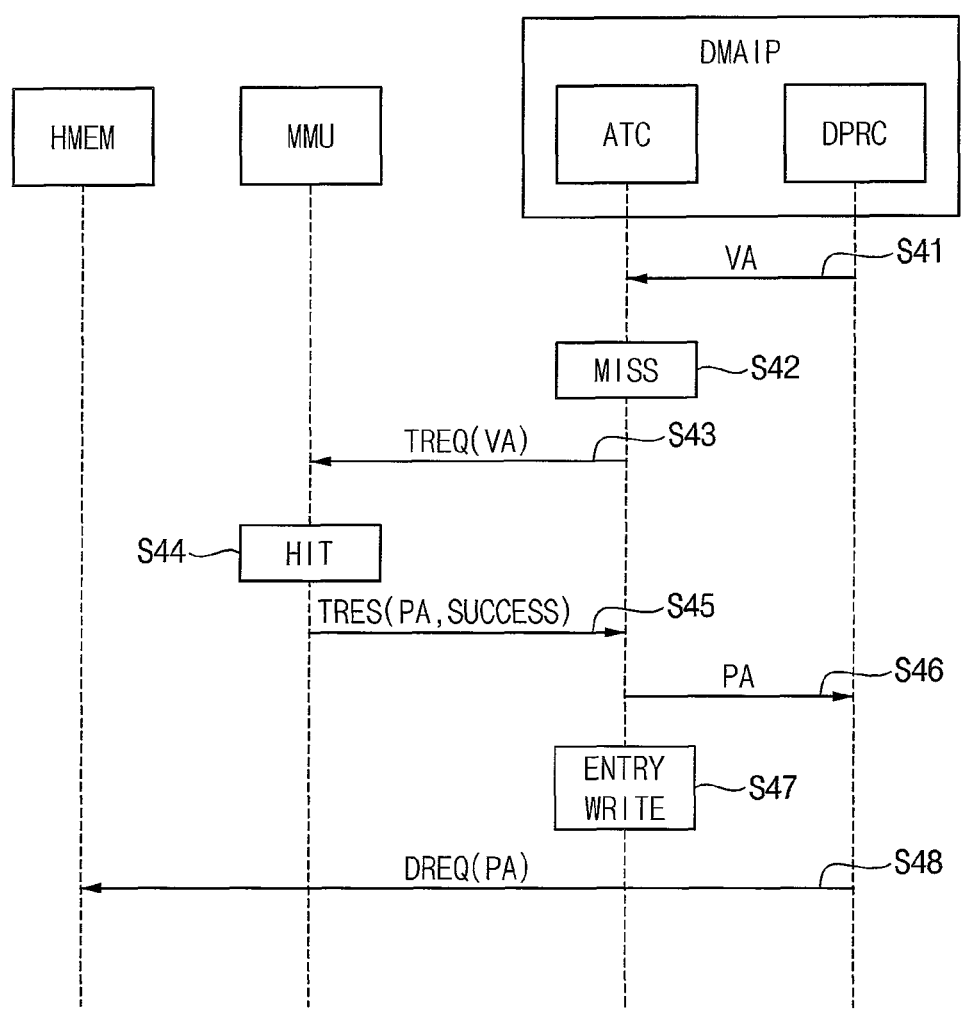

Referring to FIG. 14, the device processor DPRC may transfer the virtual address VA to the ATC (S41). When a translation entry corresponding to the virtual address VA does not exist, that is, in case of cache miss (S42), the ATC may transfer a translation request TREQ to the memory management unit MMU (S43).

When the translation entry corresponding to the virtual address VA exists in a mapping table (or a page table), that is, in case of mapping hit (S44), the memory management unit MMU may transfer a translation response TRES including the information SUCCESS indicating the translation success and the physical address PA mapped to the virtual address VA to the ATC (S45). The ATC may provide the physical address PA to the device processor DPRC (S46). In addition, a new translation entry including the mapping between the virtual address VA and the physical address PA may be stored in the ATC (S47). The device processor DPRC may transfer the direct access request DREQ including the physical address PA to the host memory device HMEM (S48).

Figure 15:
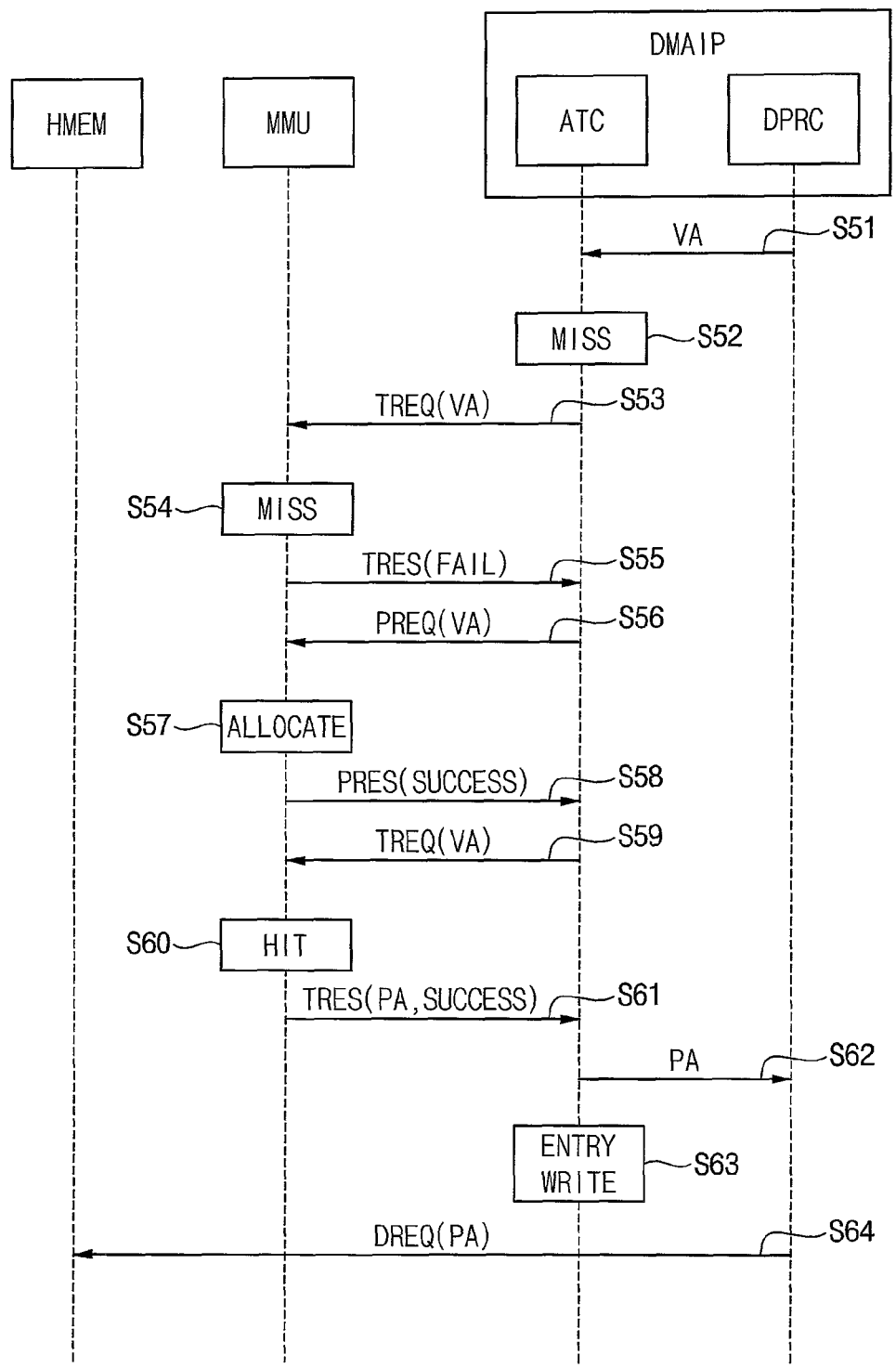

Referring to FIG. 15, the device processor DPRC may transfer the virtual address VA to the ATC (S51). When a translation entry corresponding to the virtual address VA does not exist, that is, in case of cache miss (S52), the ATC may transfer a translation request TREQ to the memory management unit MMU (S53).

When the translation entry corresponding to the virtual address VA does not exist in the mapping table, that is, in case of mapping miss (S54), the memory management unit MMU may transfer the translation response TRES including the information FAIL indicating the translation fail to the ATC (S55).

The ATC may transfer a page request PREQ including the virtual address VA to the memory management unit MMU (S56). The memory management unit MMU may generate a new translation entry by allocating a new physical address PA to the virtual address VA (S57), and transfer a page response PRES including the information SUCCESS indicating the mapping success to the ATC (S58).

The ATC may transfer the translation request TREQ including the virtual address VA to the memory management unit MMU (S59). When the translation entry corresponding to the virtual address VA exists in the mapping table, that is, in case of mapping success (S60), the memory management unit MMU may transfer the translation response TRES including the information SUCCESS indicating the translation success and the physical address PA mapped to the virtual address VA to the ATC (S61).

The ATC may provide the physical address PA to the device processor DPRC (S62). In addition, the new translation entry including the mapping between the virtual address VA and the physical address PA may be stored in the ATC (S43). The device processor DPRC may transfer the direct access request DREQ including the physical address PA to the host memory device HMEM (S64).

Figure 16:
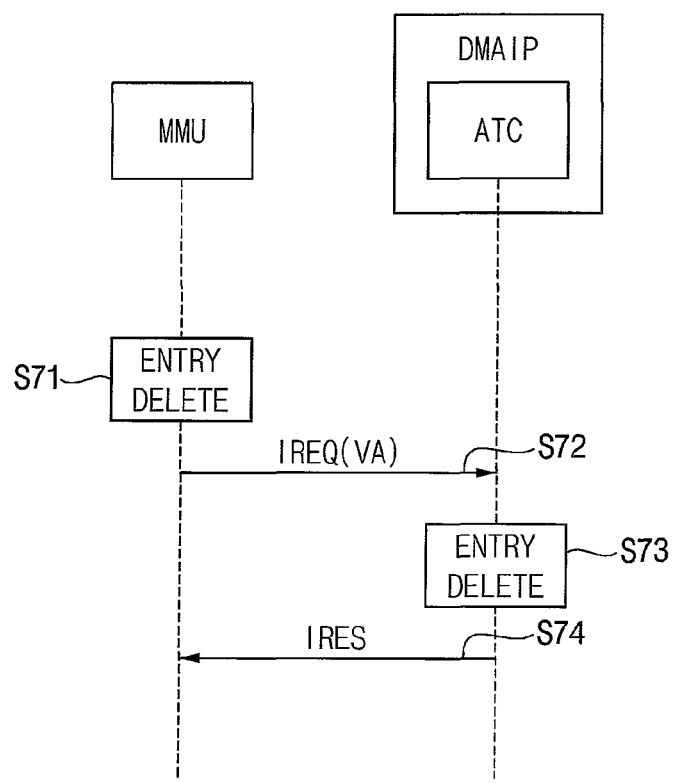

Referring to FIG. 16, when the memory management unit MMU invalidates or deletes a translation entry in the mapping table (S71), the memory management unit MMU may transfer an invalidation request IREQ including the virtual address VA corresponding to the translation entry to be invalidated to the ATC in the direct memory access device DMAIP (S72).

The ATC may delete the translation entry corresponding to the virtual address VA in the invalidation request IREQ (S73). After the deletion of the translation entry is completed, the ATC may transfer an invalidation response IRES to the memory management unit MMU (S74). As described above, the ATC may search all of the shared cache SHC and the flexible page group caches FPGCs when the ATC invalidates the translation entry.

Figure 17:
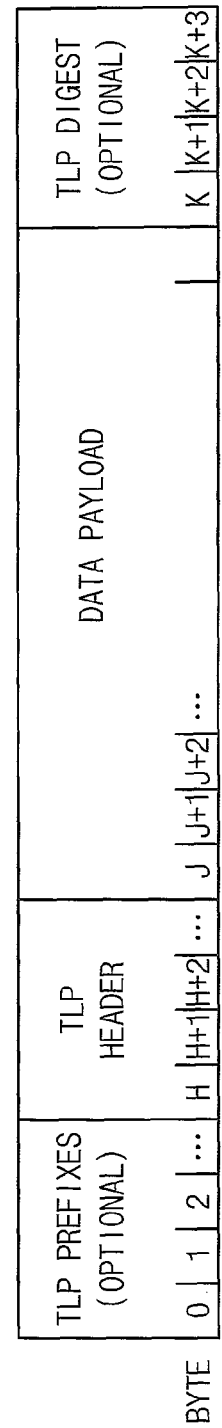
FIG. 17 is a diagram illustrating an example of a packet that is transferred in a system including an address translation cache according to example embodiments.

FIG. 17 is a diagram illustrating an example of a packet that is transferred in a system including an address translation cache according to example embodiments.

FIG. 6 illustrates a format of a transaction layer packet (TLP) that is generated and managed by a transaction layer of a PCIe architecture.

The Transactions consists of requests and completions (or responses), which are communicated using packets. As illustrated in FIG. 17, a TLP may include one or more optional TLP Prefixes, a TLP header, a data payload, and an optional TLP Digest, which are allocated to a plurality of bytes (BYTE 0~k+3).

The above-described translation request TREQ, the translation response TRES, the page request PREQ, the page response PRES, the invalidation request IREQ and the invalidation response IRES may correspond to the TLPs as illustrated in FIG. 17. Various information may be included in the TLP header and the virtual address VA corresponding to an untranslated address or the physical address PA corresponding to the translated address may be included in the data payload.

Figure 18:
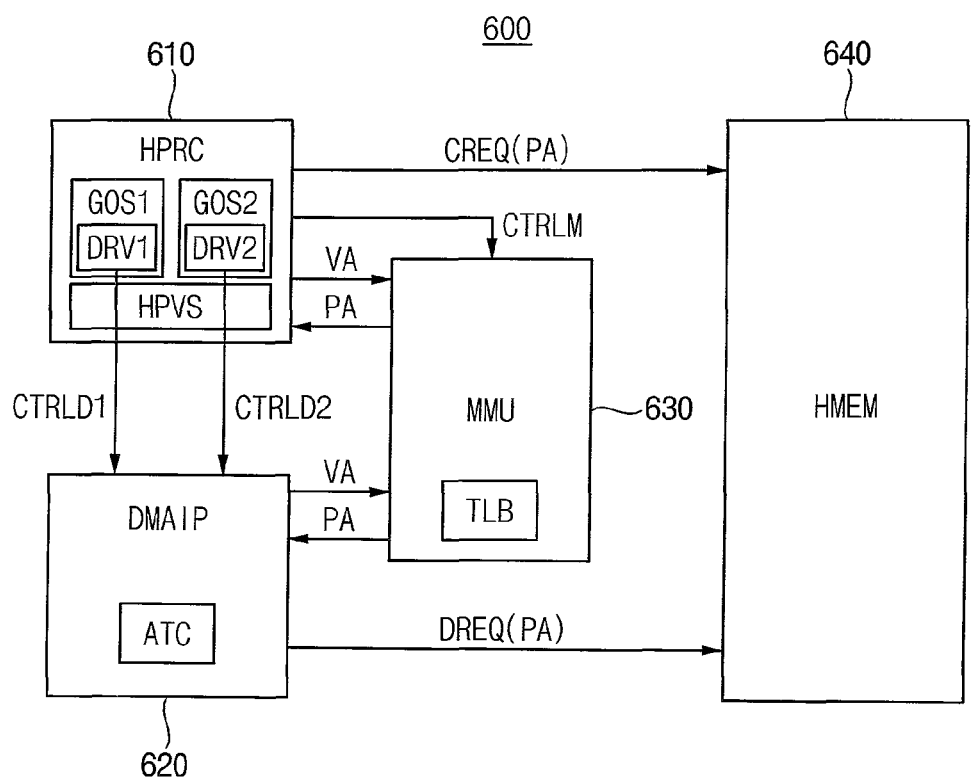
FIG. 18 is a block diagram illustrating a virtualized system including an address translation cache according to example embodiments.

FIG. 18 is a block diagram illustrating a virtualized system including an address translation cache according to example embodiments.

Referring to FIG. 18, a virtualized system 600 may include a host processor HPRC 610 (e.g., a CPU), a direct memory access device DMAIP 620, a memory management unit (or a memory management circuit) 630 and a host memory device 640.

The memory management unit 630 may include a translation look aside buffer (TLB) configured to store the address mapping information referenced recently and/or frequently. The direct memory access device 620 may include an address translation cache ATC according to example embodiments. The virtualized system 600 of FIG. 18 is similar to the system 400 of FIG. 12, and repeated descriptions may be omitted.

The host processor 610 may provide a virtualization environment. A hypervisor HPVS and a plurality of guest operating systems GOS1 and GOS2 may run on the virtualization environment. FIG. 18 illustrates two guest operating systems, that is, a first guest operating system GOS1 and a second guest operating system GOS2 for convenience of illustration and description, and example embodiments are not limited thereto. The number of the guest operating systems controlled by the hypervisor HPVS may be determined variously according to the virtualization environment.

FIG. 18 illustrates that the hypervisor HPVS and the plurality of guest operating systems GOS1 and GOS2 are included in the host processor 610 for convenience of illustration. The hypervisor HPVS and the plurality of guest operating systems GOS1 and GOS2 may be loaded in the host memory device 640 as the software program codes and may be executed by the host processor 610.

The plurality of guest operating systems GOS1 and GOS2 may run independently from each other on a plurality of virtual machines of the virtualization environment, and the hypervisor HPVS may control the plurality of virtual machines in the virtualization environment. The virtualization environment will be described below with reference to FIG. 19.

The first guest operation system GOS1 may include a first device driver DRV1 and the first guest operating system GOS1 may control the direct memory access device 620 through the first device driver DRV1. The first device driver DRV1 may generate control signals CTRLD1 to control the direct memory access device 620.

The second guest operating system GOS2 may include a second device driver DRV2 and the second guest operating system GOS2 may control the direct memory access device 620 through the second device driver DRV2. The second device driver DRV2 may generate control signals CTRLD2 to control the direct memory access device 620.

Figure 19:
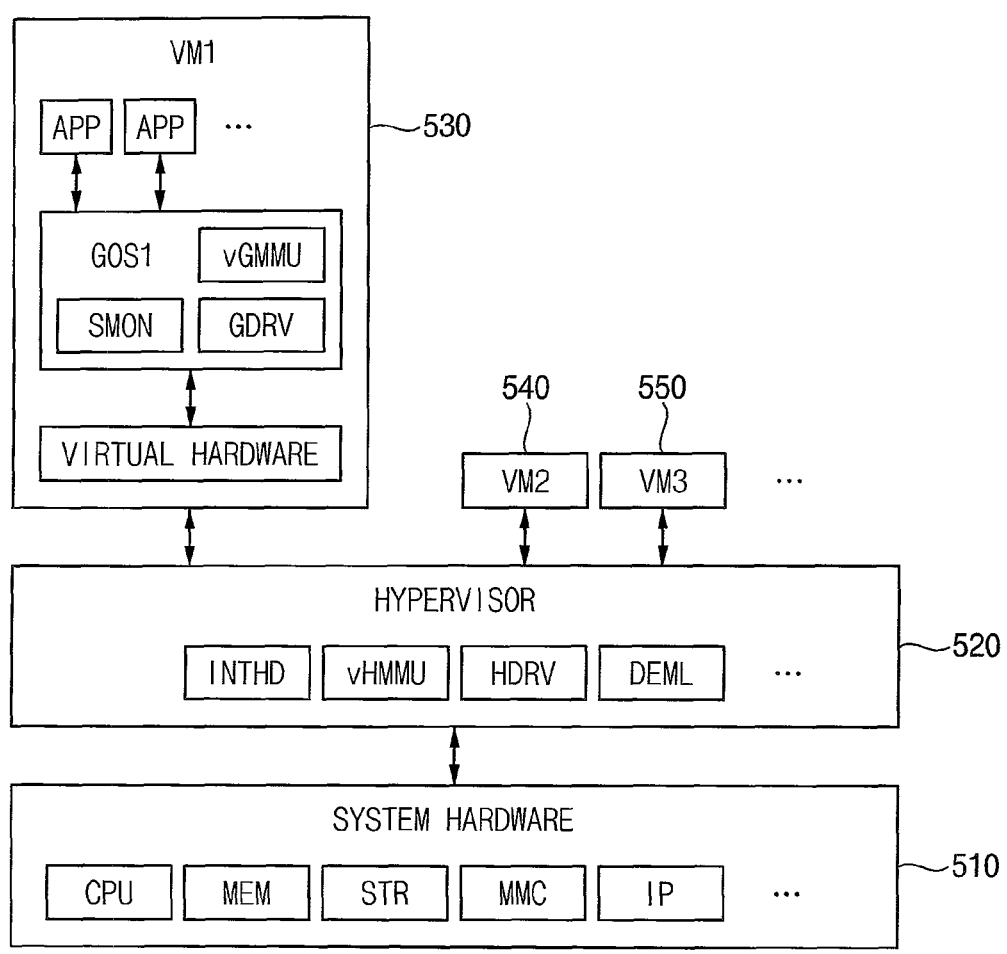
FIG. 19 is a block diagram illustrating a virtualized system according to example embodiments.

FIG. 19 is a block diagram illustrating a virtualized system according to example embodiments.

Referring to FIG. 19, a virtualized system 500 may include system hardware 510 and software runs on a virtualization environment provided by the system hardware 510. The software may include a hypervisor 520 and a plurality of virtual machines VM1 530, VM2 540 and VM3 550. FIG. 19 illustrates the three virtual machines 530, 540 and 550 for convenience of illustration, and the number of virtual machines installed on the hypervisor 520 may be determined variously.

The system hardware 510 may include a central processing unit CPU, a memory device MEM, a storage device STR, a memory management circuit MMC, one or more intellectual properties IPs. The central processing unit CPU may be a single processor or include a plurality of processor cores. When the central processing unit CPU include a plurality of processor cores, one of the processor cores may correspond to the processor 610 in FIG. 18 that provides the virtualization environment.

The virtual machines 530, 540 and 550 may have various configurations to perform respective functions. Hereinafter, one virtual machine 530 is described as an example. As illustrated in FIG. 3, the virtual machine 530 may include a virtual hardware, a guest operating system GOS1 and applications APPs.

The virtual hardware may correspond to physical components that are emulated as software in the virtual machine 530. In other words, corresponding physical components of the virtualized system 500 may be virtualized as virtual hardware. The virtual hardware may include virtual components emulating the physical components allocated to the virtual machine 530 among the entire physical components in the system hardware 510. For example, the virtual hardware may include a virtual processor emulating the central processing unit CPU, a virtual memory device emulating the memory device MEM, a virtual IP emulating the IP, etc.

For example, the guest operating system GOS1 may include a virtual memory management unit vGMMU, a device driver GDRV, a state monitor SMON, etc.

The virtual memory management unit vGMMU may allocate a virtual address space of the guest operating system GOS1 to the applications APPs running on the guest operating system GOS1. The virtual memory management unit vGMMU may manage mapping between a virtual address in the virtual address space and an intermediate physical address of the virtual memory device included in the virtual hardware.

The device driver GDRV may control the IP included in the system hardware 510 via the virtual IP included in the virtual hardware.

The state monitor SMON may provide state information by monitoring the virtual machine 530 and/or the guest operating system GOS1. For example, the state monitor SMON may provide the state information periodically while the virtual machine 530 operates normally. In this case, the hypervisor 520 may determine to reboot the guest operating system GOS1 when the state information is not provided for a predetermined time interval.

The hypervisor 520 may generate, schedule and manage the plurality of virtual machines 530, 540 and 550. The hypervisor 520 may provide interface between the plurality of virtual machines 530, 540 and 550 and the system hardware 510, and manage execution of instructions and data transfer associated with the plurality of virtual machines 530, 540 and 550. The hypervisor 520 may be referred to as a virtual machine monitor or a virtual machine manager.

For example, the hypervisor 520 may include an interrupt handler INTHD, a virtual memory management unit vHMMU, a device driver HDRV, a device emulator DEML, etc.

The virtual memory management unit vHMMU may allocate a plurality of guest memory regions of the memory device MEM to the plurality of virtual machines 530, 540 and 550 or the plurality of guest operating systems. The virtual memory management unit vHMMU may manage mapping between the intermediate physical address of the virtual memory devices in the plurality of virtual machines 530, 540 and 550 and the physical address of the memory device MEM.

The device driver HDRV may directly control the IP included in the system hardware 510. Each IP in the system hardware 510 may be controlled by the device driver GDRV included in the guest operating system GOS1 and/or the device driver HDRV included in the hypervisor 520.

The interrupt handler INTHD may control abnormal operations of the virtualized system 500 based on information from the virtual machines 530, 540 and 550 and/or information from the system hardware 510. For example, the interrupt handler INTHD may determine rebooting of guest operating systems respectively included in the virtual machines 530, 540 and 550.

The device emulator DEML may allocate the physical components respectively to the virtual machines 530, 540 and 550, and establish and manage the virtual hardware by emulating the allocated physical components.

Figure 20:
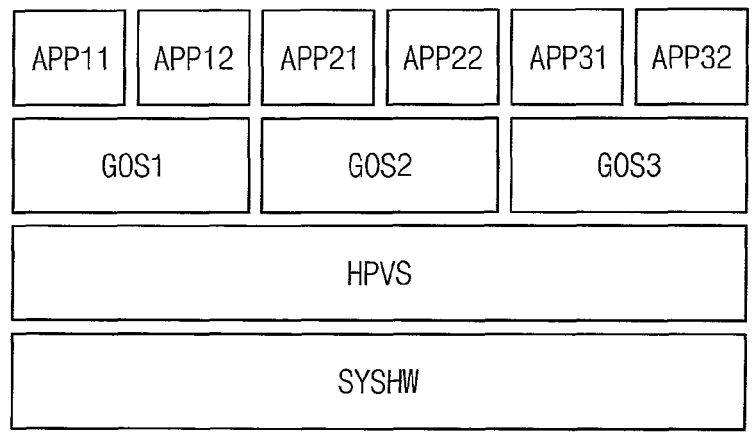
FIGS. 20, 21 and 22 are diagrams illustrating example embodiments of a hierarchical structure of a virtualization environment of a virtualized system according to example embodiments.
Figure 21:
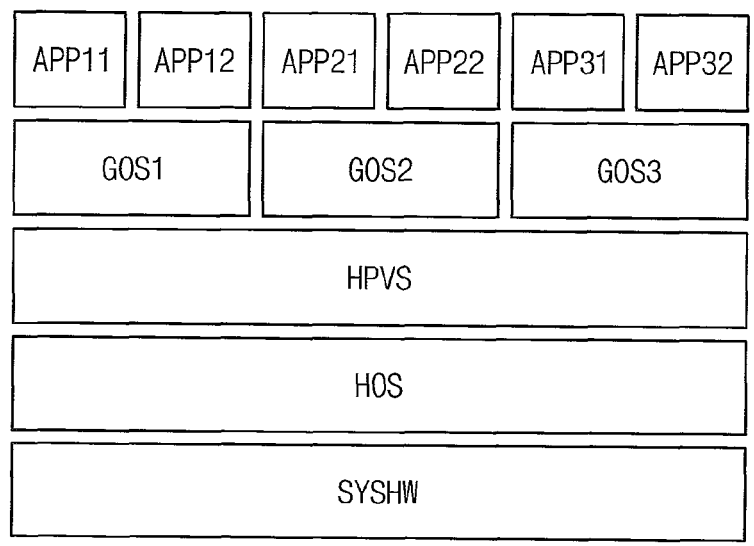
Figure 22:
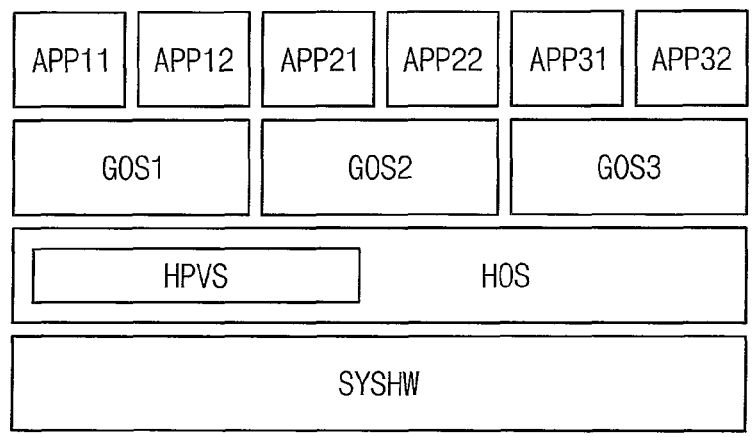

FIGS. 20, 21 and 22 are diagrams illustrating example embodiments of a hierarchical structure of a virtualization environment of a virtualized system according to example embodiments.

Referring to FIGS. 20, 21 and 22, a virtualization environment may include a plurality of guest operating systems GOS1, GOS2 and GOS3 and applications running on the plurality of guest operating systems GOS1, GOS2 and GOS3. For example, the applications APP11 and APP12 may run on the first guest operating system GOS1, the applications APP21 and APP22 may run on the second guest operating system GOS2, and the applications APP31 and APP32 may run on the third guest operating system GOS3. The number of guest operating systems and the number of applications running on each guest operating system may be determined variously.

The hypervisor HPVS may be divided largely into a first type and a second type. FIG. 20 illustrates the hypervisor HPVS of the first type, and FIGS. 21 and 22 illustrate the hypervisors HPVS of the second type. The hypervisor HPVS of the first type may be referred to as a standalone hypervisor and the hypervisor HPVS of the second type may be referred to as a hosted hypervisor. The representative open source hypervisor includes Xen of the first type and KVM of the second type.

Referring to FIG. 20, the hypervisor HPVS of the first type may run on the system hardware SYSHW and have a full control with respect to the system hardware SYSHW. In this case, the host operating system does not exist in the virtualization hierarchical structure, and one of the guest operating systems GOS1, GOS2 and GOS3 may perform a function of the host operating system. The applications may run on the hypervisor HPVS of the first type.

The hypervisor HPVS of the second type may run on the host operating system HOS as illustrated in FIG. 21, or may be included in the host operating system HOS as illustrated in FIG. 22. In this case, the host operating system HOS has a full control with respect to the system hardware SYSHW. The host operating system HOS may run on the system hardware SYSHW and the applications may run on the host operating system HOS.

Figure 23:
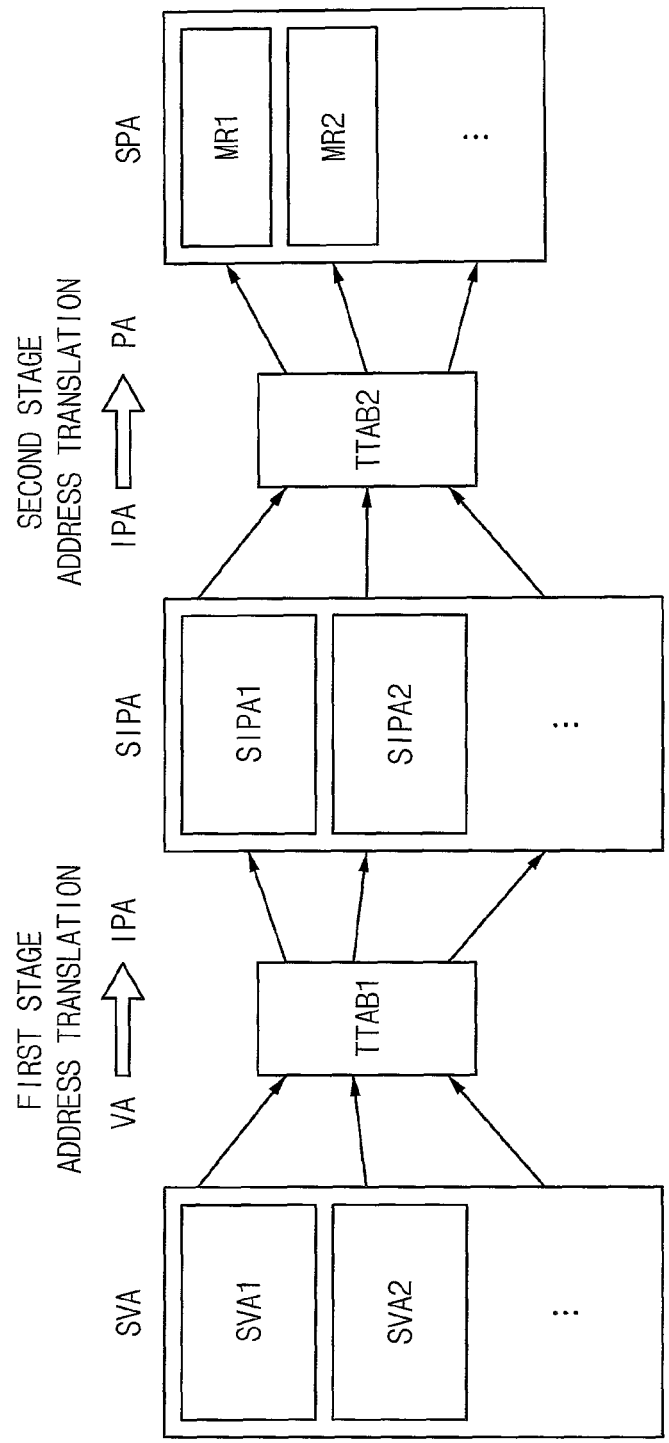
FIGS. 23 and 24 are diagrams illustrating a two-stage address translation of a virtualized system according to example embodiments.
Figure 24:
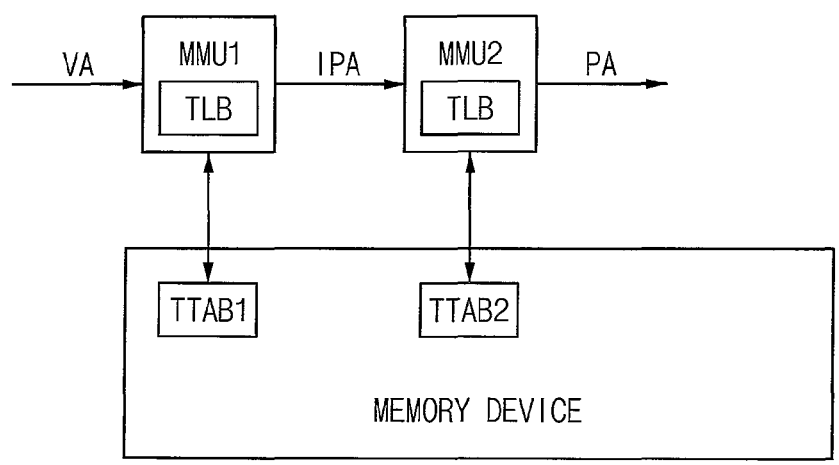

FIGS. 23 and 24 are diagrams illustrating a two-stage address translation of a virtualized system according to example embodiments.

Referring to FIGS. 23 and 24, a two-stage address translation may include a first stage address translation to convert a virtual address VA of the plurality of guest operating systems to an intermediate physical address IPA of the virtual memory devices in the virtual machines and a second stage address translation to convert the intermediate address IPA to a physical address PA of the memory device.

The virtual address VA indicates a position in a virtual address space SVA, the intermediate physical address IPA indicates a position in an intermediate address space SIPA and the physical address PA indicates a real physical position of the memory region of the memory device.

As described with reference to FIG. 19, each of the guest operating systems GOS1 and GOS2 may include the virtual memory management unit vGMMU. The virtual memory management unit vGMMU may manage mapping between the virtual address VA of guest virtual address spaces SVA1 and SVA2 respectively corresponding to the guest operating systems GOS1 and GOS2, and the intermediate physical address IPA of the guest intermediate physical address spaces SIPA1 and SIPA2 respectively corresponding to the guest operating systems GOS1 and GOS2.

The mapping information managed by the virtual memory management unit vGMMU may be stored in the first stage translation table TTAB1 and the first stage translation table TTAB1 may be referenced to access the memory device.

FIG. 23 illustrates, for convenience of illustration, that the guest virtual address spaces SVA1 and SVA2 are spatially separated and the guest intermediate physical address spaces SIPA1 and SIPA2 are spatially separated. The superposition of the address spaces may not be considered because the guest operating systems GOS1 and GOS2 run independently from each other.

In addition, as described with reference to FIG. 19, the hypervisor HPVS may include the virtual memory management unit vHMMU. The virtual memory management unit vHMMU may allocate the guest memory regions MR1 and MR2 of the memory device respectively to the guest operating systems GOS1 and GOS2. The guest memory regions MR1 and MR2 have to be allocated to be spatially separated from each other.

The first guest operating system GOS1 may access only the first guest memory region MR1 and the second guest operating system GOS2 may access only the second guest memory region MR2. For example, the first guest operating system GOS1 is not able to access the second guest memory region MR2, and the second guest operating system GOS2 is not able to access the first guest memory region MR1. As a result, the hypervisor HPVS may provide spatial isolation to prevent memory crash between the plurality of guest operating systems GOS1 and GOS2.

The virtual memory management unit vHMMU may manage mapping between the intermediate physical address IPA of the guest intermediate physical address spaces SIPA1 and SIPA2 and the physical address PA of the allocated guest memory regions MR1 and MR2.

The mapping information managed by the virtual memory management unit vHMMU may be stored in the second stage translation table TTAB2 and the second stage translation table TTAB2 may be referenced to access the memory device.

In general, the hypervisor HPVS may allocate the guest memory regions adaptively by monitoring the state of memory usage by the plurality of guest operating systems GOS1 and GOS2.

Referring to FIG. 24, the first stage translation table TTAB1 and the second stage translation table TTAB2 including the address mapping information may be stored in the memory device. The first stage translation table TTAB1 and the second stage translation table TTAB2 stored in the memory device may be referenced for address translation during the access operations.

To enhance the speed and the efficiency of the address translation, the virtualized system may include memory management units MMU1 and MMU2 implemented as hardware as illustrated in FIG. 24. The memory management units MMU1 and MMU2 may be included in the memory management circuit 630 in FIG. 18.

The first memory management unit MMU1 may perform the first stage address translation based on the address mapping information of the first stage translation table TTAB1 to convert the virtual address VA for the access operation with respect to the memory device to the intermediate physical address IPA.

The second memory management unit MMU2 may perform the second stage address translation based on the address mapping information of the second stage translation table TTAB2 to convert the intermediate physical address IPA transferred from the first memory management unit MMU1 to the physical address PA of the memory device.

The first memory management unit MMU1 and/or the second memory management unit MMU2 may include a translation look aside buffer (TLB) to further enhance the speed and the efficiency of the address translation. The TLB may store the address mapping information referenced recently and/or frequently.

Figure 25:
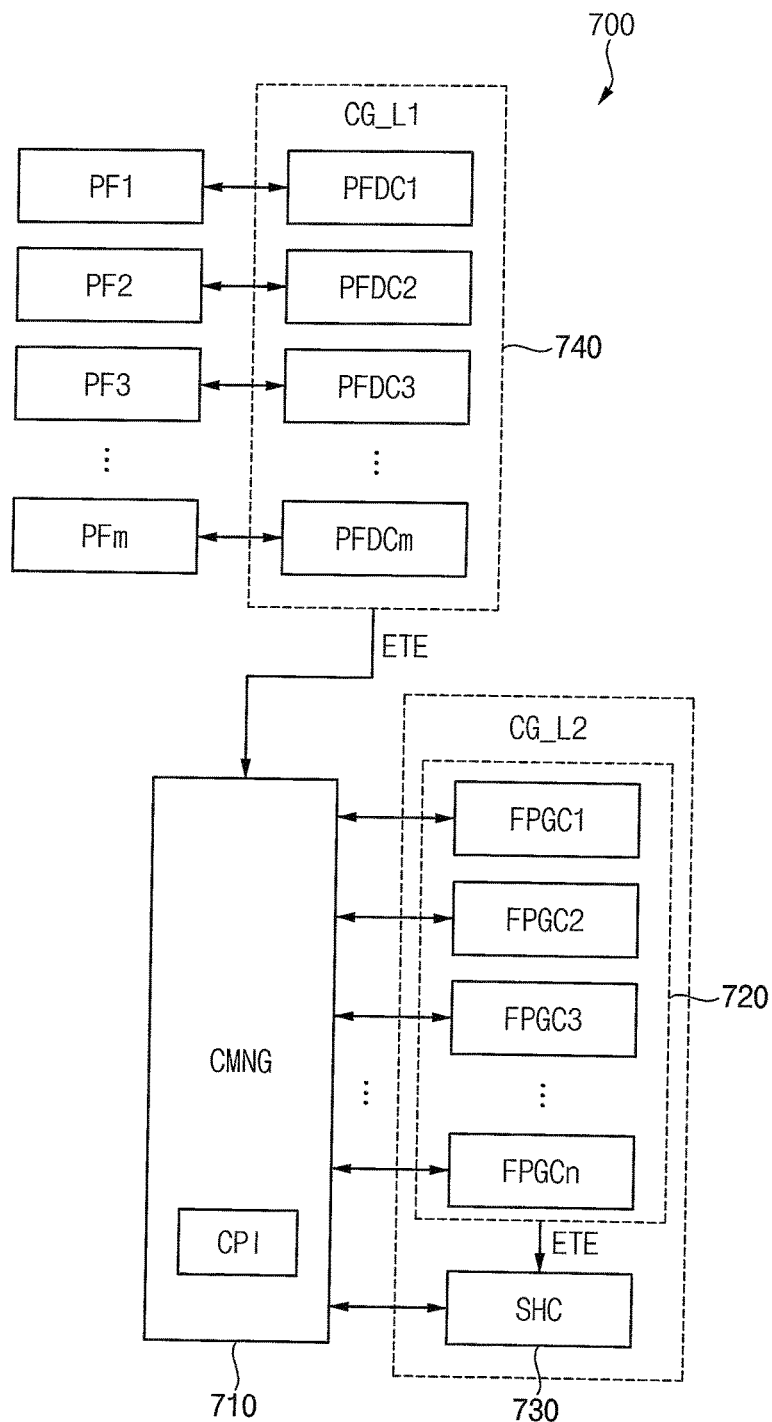
FIG. 25 is a block diagram illustrating an address translation cache according to example embodiments.

FIG. 25 is a block diagram illustrating an address translation cache according to example embodiments.

Referring to FIG. 25, an ATC 700 may include a cache manager CMNG 710, a plurality of flexible page group caches FPGC1~FPGCn 720, a shared cache SHC 730 and a plurality of function-dedicated caches PFDC1~PFDCm 740. The ATC 700 stores translation entries indicating mapping information between a virtual address and a physical address of a memory device.

In comparison with the ATC 100 of FIG. 1, the ATC 700 of FIG. 25 further includes the plurality of function-dedicated caches 740. Hereinafter, descriptions repeated with FIG. 1 are omitted, and differences associated with the plurality of function-dedicated caches 740 are described.

The plurality of function-dedicated caches PFDC1~PFDCm may be dedicated to a plurality of functions PF1~PFm such that each function-dedicated cache may store the translation entries related with each function.

In some example embodiments, the plurality of function-dedicated caches PFDC1~PFDCm may be implemented with a plurality of fully associative caches. For example, the plurality of function-dedicated caches PFDC1~PFDCm may store the translation entries associated with the functions PF1~PFm respectively, regardless of the page sizes.

In some example embodiments, the plurality of functions PF1~PFm may be functions according to a peripheral component interconnect express (PCIe) standard. The plurality of functions PF1~PFm may respectively correspond to the plurality of guest operating systems as described above. The addresses, the requests, the responses and the translation entries may be differentiated from each other using the function identifier as described above with reference to FIG. 6.

The plurality of function-dedicated caches PFDC1~PFDCm may correspond to a lower-level cache group CG_L1 and the plurality of flexible page group caches FPGC1~FPGCn and the shared cache SHC may correspond to a higher-level cache group CG_L2.

When the cache manager 710 performs the entry searching operation to search for a physical address mapped to an input virtual address, the cache manager 710 may search the function-dedicated cache corresponding to a function identifier included in the input virtual address. When the translation entry corresponding to the input virtual address does not exist in the function-dedicated cache corresponding to the function identifier, the cache manager 710 may search all of the plurality of flexible page group caches FPGC1~FPGCn and the shared cache SHC.

When the cache manager 710 performs the entry invalidating operation to invalidate the translation entry corresponding to an input virtual address, the cache manager 710 may search all of the plurality of function-dedicated caches PFDC1~PFDCm, the plurality of flexible page group caches FPGC1~FPGCn and the shared cache SHC.

Figure 26:
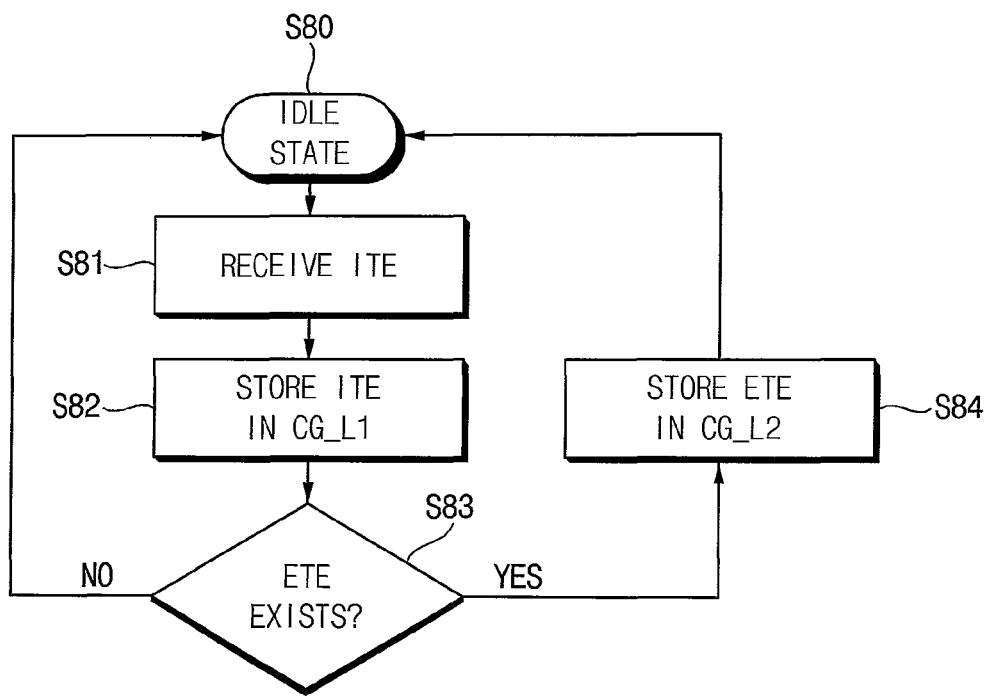
FIG. 26 is a flowchart illustrating an example embodiment of an entry write operation of an address translation cache according to example embodiments.

FIG. 26 is a flowchart illustrating an example embodiment of an entry write operation of an address translation cache according to example embodiments.

Referring to FIGS. 25 and 26, the cache manager CMNG 710 in the idle state S80 may receive an input translation entry ITE (S81). The cache manager 710 may store the input translation entry ITE in the lower-level cache group CG_L1 (S82). For example, the cache manager 710 may store the input translation entry ITE in the function-dedicated cache corresponding to the function identifier PFID included in the input translation entry ITE.

When there exists an evicted translation entry ETE that is evicted from the function-dedicated cache (S83: YES), the cache manager 710 may store the evicted translation entry ETE in the higher-level cache group CG_L2 (S84), and return to the idle state (S80). In this case, the cache manager 710 may store the evicted translation entry ETE in the plurality of flexible page group caches FPGC1~FPGCn or the shared cache SHC according to the method described with reference to FIG. 4. When an evicted translation entry ETE does not exist (S83: NO), the cache manager 710 may return to the idle state (S80).

Figure 27:
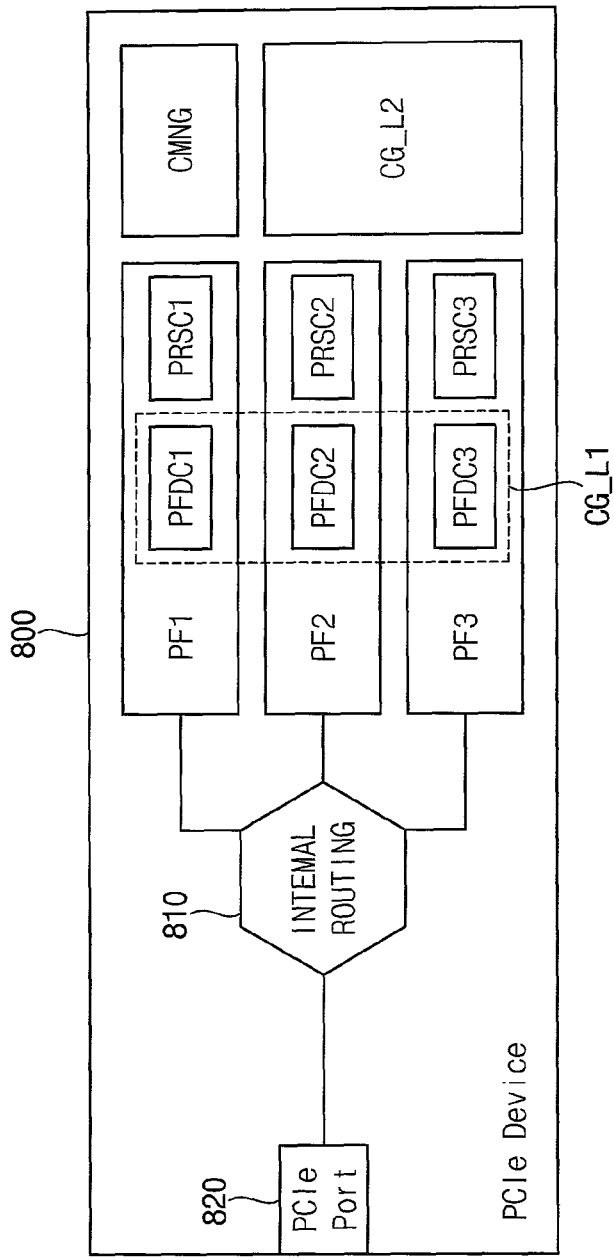
FIG. 27 is a diagram illustrating a device including an address translation cache according to example embodiments.

FIG. 27 is a diagram illustrating a device including an address translation cache according to example embodiments.

Referring to FIG. 27, a device 800 may be a PCIe device according to the PCIe standard. The PCIe device may receive signals through a PCIe port 820, and transfer the received signals respectively to a plurality of functions PF1, PF2 and PF3 through an internal routing 810. The internal routing 810 may route each received signal based on a function identifier PFID included in each received signal.

Each of the plurality of functions PF1, PF2 and PF3 may include each of a plurality of function-dedicated caches PFDC1, PFDC2 and PFDC3 and each of a plurality of physical resources PRSC1, PRSC2 and PRSC3. As described above, the plurality of function-dedicated caches PFDC1, PFDC2 and PFDC3 may correspond to the lower-level cache group CG_L1. The PCIe device 800 may further include a cache manager CMNG and the higher-level cache group CL_L2. As described above, the higher-level cache group CG_L2 may include a plurality of flexible page group caches and a shared cache.

Figure 28:
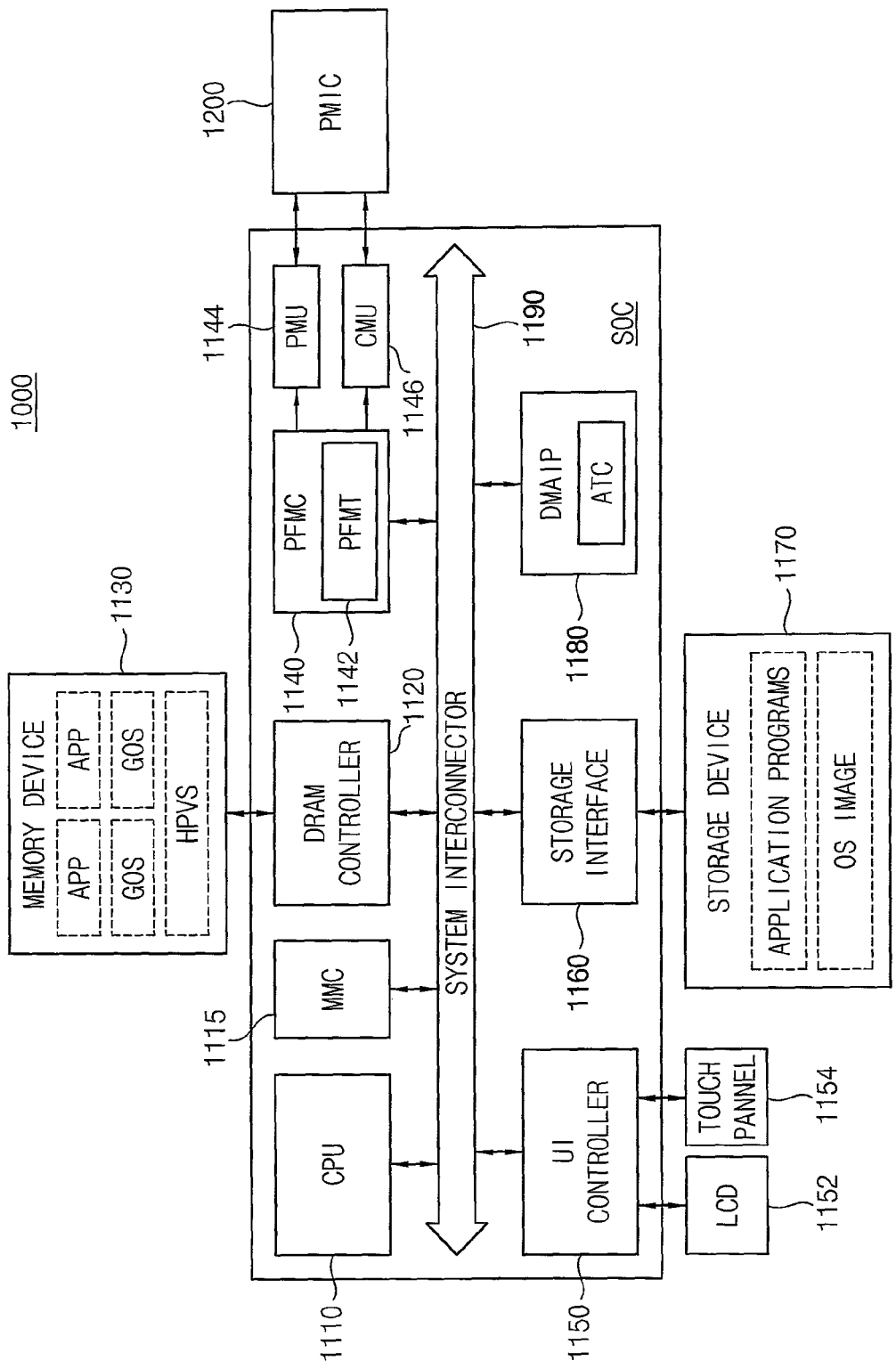
FIG. 28 is a block diagram illustrating a virtualized system according to example embodiments.

FIG. 28 is a block diagram illustrating a virtualized system according to example embodiments.

Referring to FIG. 28, a virtualized system 1000 may include a system on chip (SoC), a working memory 1130, a display device (LCD) 1152, a touch panel 1154, a storage device 1170, a power management integrated circuit (PMIC) 1200, etc. The SoC may include a processor (CPU) 1110, a memory management unit MMC 1115, a DRAM controller 1120, a performance controller 1140, a user interface controller (UI controller) 1150, a storage interface 1160, and a direct memory access device DMAIP 1180 having a function of direct memory access, a power management unit (PMU) 1144, a clock management unit (CMU) 1146, etc. It will be understood that components of the virtualized system 1000 are not limited to the components shown in FIG. 28. For example, the virtualized system 1000 may further include a hardware codec for processing image data, a security block, and the like.

The processor 1110 executes software (for example, an application program, an operating system (OS), and device drivers) for the virtualized system 1000. The processor 1110 may execute the operating system (OS) which may be loaded into the working memory 1130. The processor 1110 may execute various application programs to be driven on the operating system (OS). The processor 1110 may be provided as a homogeneous multi-core processor or a heterogeneous multi-core processor. A multi-core processor is a computing component including at least two independently drivable processors (hereinafter referred to as "cores" or "processor cores"). Each of the cores may independently read and execute program instructions.

The DRAM controller 1120 provides interfacing between the working memory 1130 and the system-on-chip (SoC). The DRAM controller 1120 may access the working memory 1130 according to a request of the processor 1110 or another intellectual property (IP) block.

The memory management unit (or the memory management circuit) 1115 may manage the core access of the processor 1110 to the working memory 1130 and the direct access of the direct memory access device 1180 to the working memory 1130.

The operating system (OS) or basic application programs may be loaded into the working memory 1130 during a booting operation. For example, a hypervisor HPVS and a plurality of guest operating systems GOSs stored in the storage device 1170 may be loaded into the working memory 1130 based on a booting sequence during booting of the virtualized system 1000. After that, applications APPS corresponding to the plurality of guest operating systems GOSs may be loaded in the working memory 1130.

The performance controller 1140 may adjust operation parameters of the system-on-chip (SoC) according to a control request provided from the kernel of the operating system (OS). For example, the performance controller 1140 may adjust the level of dynamic voltage and frequency scaling (DVFS) to enhance performance of the system-on-chip (SoC).

The user interface controller 1150 controls user input and output from user interface devices. For example, the user interface controller 1150 may display a keyboard screen for inputting data to the LCD 1152 according to the control of the processor 1110. Alternatively, the user interface controller 1150 may control the LCD 1152 to display data that a user requests. The user interface controller 1150 may decode data provided from user input means, such as a touch panel 1154, into user input data.

The storage interface 1160 accesses the storage device 1170 according to a request of the processor 1110. For example, the storage interface 1160 provides interfacing between the system-on-chip (SoC) and the storage device 1170. For example, data processed by the processor 1110 is stored in the storage device 1170 through the storage interface 1160. Alternatively, data stored in the storage device 1170 may be provided to the processor 1110 through the storage interface 1160.

The storage device 1170 is provided as a storage medium of the virtualized system 1000. The storage device 1170 may store application programs, an OS image, and various types of data. The storage device 170 may be provided as a memory card (e.g., MMC, eMMC, SD, MicroSD, etc.). The storage device 170 may include a NAND-type flash memory with high-capacity storage capability. Alternatively, the storage device 1170 may include a next-generation nonvolatile memory such as PRAM, MRAM, ReRAM, and FRAM or a NOR-type flash memory.

The direct memory access device 1180 may be provided as a separate intellectual property (IP) component to increase processing speed of a multimedia or multimedia data. For example, the direct memory access device 1180 may be provided as an intellectual property (IP) component to enhance processing performance of a text, audio, still images, animation, video, two-dimensional data or three-dimensional data.

A system interconnector 1190 may be a system bus to provide an on-chip network in the system-on-chip (SoC). The system interconnector 1190 may include, for example, a data bus, an address bus, and a control bus. The data bus is a data transfer path. A memory access path to the working memory 1130 or the storage device 1170 may also be provided. The address bus provides an address exchange path between intellectual properties (IPs). The control bus provides a path along which a control signal is transmitted between intellectual properties (IPs). However, the configuration of the system interconnector 1190 is not limited to the above description and the system interconnector 190 may further include arbitration means for efficient management.

According to example embodiments, the direct memory access device 1180 may include an address translation cache ATC as described above with reference to FIGS. 1 through 27.

As described above, the address translation cache according to example embodiments may efficiently utilize the cache memory resources and reduce the search time for the address mapping information, by dynamically allocating the page sizes to the plurality of flexible page group caches and storing the translation entries per page size based on the allocated page sizes.

Example embodiments may be applied to any electronic devices and systems having a function of direct memory access. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, an automotive driving system, a server system, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. An address translation cache (ATC) configured to store translation entries indicating mapping information between a virtual address and a physical address of a memory device, the ATC comprising:

a plurality of flexible page group caches, each flexible page group cache configured to store translation entries corresponding to a page size allocated to the flexible page group cache;

a shared cache configured to store, regardless of page sizes, translation entries that are not stored in the plurality of flexible page group caches; and a cache manager configured to allocate a page size to each flexible page group cache, manage cache page information on the page sizes allocated to the plurality of flexible page group caches, and control the plurality of flexible page group caches and the shared cache based on the cache page information, wherein the plurality of flexible page group caches are implemented with a plurality of set associative caches and the shared cache is implemented with a fully associative cache.

2. The ATC of claim 1, wherein the cache manager is configured such that when the cache manager receives an input translation entry corresponding to the page size that is identical to one of the page sizes allocated to the plurality of flexible page group caches, the cache manager stores the input translation entry in the flexible page group cache to which the page size corresponding to the input translation entry is allocated.

3. The ATC of claim 1, wherein the cache manager is further configured such that when the cache manager receives an input translation entry corresponding to a new page size that is different from the page sizes allocated to the plurality of flexible page group caches and there exists an empty flexible page group cache among the plurality of flexible page group caches to which the page size is not allocated, the cache manager allocates the new page size to the empty flexible page group cache and stores the input translation entry in the empty flexible page group cache to which the new page size is allocated.

4. The ATC of claim 1, wherein the cache manager is configured to store, in the shared cache, a translation entry evicted from the plurality of flexible page group caches.

5. The ATC of claim 1, wherein the plurality of set associative caches each include the same number of sets.

6. The ATC of claim 5, wherein each translation entry in each set associative cache includes a tag, and a number of bits of each tag stored in each set associative cache is decreased as the page size allocated to each set associative cache is increased.

7. The ATC of claim 1, wherein the cache manager is configured such that for each virtual address input to the ATC, when the cache manager searches for a physical address mapped to the input virtual address, the cache manager searches all of the plurality of set associative caches and the fully associative cache.

8. The ATC of claim 7, wherein the cache manager is configured to extract, from the input virtual addresses, tags and indexes corresponding to the page sizes allocated to the plurality of set associative caches based on the cache page information, and provide the tags and indexes respectively to the corresponding set associative caches.

9. The ATC of claim 1, wherein the cache manager is configured such that, when the cache manager invalidates a translation entry corresponding to an input virtual address, the cache manager searches all of the plurality of set associative caches and the fully associative cache.

10. The ATC of claim 1, further comprising:
a plurality of function-dedicated caches dedicated to a plurality of functions, each function-dedicated cache configured to store translation entries related to each function.

11. The ATC of claim 10, wherein the plurality of function-dedicated caches correspond to a lower-level cache group and the plurality of flexible page group caches and the shared cache correspond to a higher-level cache group.

12. The ATC of claim 10, wherein the cache manager is configured such that when the cache manager searches for a physical address mapped to an input virtual address, the cache manager searches the function-dedicated cache corresponding to a function identifier included in the input virtual address and searches all of the plurality of flexible page group caches and the shared cache when the translation entry corresponding to the input virtual address does not exist in the function-dedicated cache corresponding to the function identifier.

13. The ATC of claim 10, wherein the cache manager is configured such that when the cache manager invalidates a translation entry corresponding to an input virtual address, the cache manager searches all of the plurality of function-dedicated caches, the plurality of flexible page group caches and the shared cache.

14. The ATC of claim 10, wherein the cache manager is configured to store, in the plurality of flexible page group caches or the shared cache, a translation entry evicted from the plurality of function-dedicated caches.

15. The ATC of claim 10, wherein the plurality of function-dedicated caches are implemented with a plurality of fully associative caches.

16. The ATC of claim 10, wherein the plurality of functions are functions according to a peripheral component interconnect express (PCIe) standard.

17. An address translation cache (ATC) configured to store translation entries indicating mapping information between a virtual address and a physical address of a memory device, the ATC comprising:

a plurality of flexible page group caches, each flexible page group cache configured to store translation entries corresponding to a page size allocated to the flexible page group cache;

a shared cache configured to store, regardless of page sizes, translation entries that are not stored in the plurality of flexible page group caches;

a cache manager configured to allocate a page size to each flexible page group cache, manage cache page information on the page sizes allocated to the plurality of flexible page group caches, and control the plurality of flexible page group caches and the shared cache based on the cache page information, wherein the cache manager is further configured such that:

when the cache manager receives an input translation entry corresponding to a new page size that is different from the page sizes allocated to the plurality of flexible page group caches and there exists an empty flexible page group cache among the plurality of flexible page group caches to which the page size is not allocated, the cache manager allocates the new page size to the empty flexible page group cache and stores the input translation entry in the empty flexible page group cache to which the new page size is allocated, and when the cache manager receives an input translation entry corresponding to a new page size that is different from the page sizes allocated to the plurality of flexible page group caches and there does not exist an empty flexible page group cache to which the page size is not allocated, the cache manager stores the input translation entry in the shared cache.

18. The ATC of claim 17, wherein the plurality of flexible page group caches are implemented with a plurality of set associative caches and the shared cache is implemented with a fully associative cache.

19. A system comprising:
- a host memory device;
- a host processor;
- a direct memory access device configured to perform a direct memory access to the host memory device, the direct memory access device including an address translation cache (ATC) configured to store translation entries indicating mapping information between a virtual address of the host processor and a physical address of a memory device; and
- a memory management unit configured to manage access of the host processor and the direct memory access device to the host memory device,
wherein the ATC includes:
- a plurality of flexible page group caches, each flexible page group cache configured to store translation entries corresponding to a page size allocated to the flexible group cache;
- a shared cache configured to store, regardless of page sizes, translation entries that are not stored in the plurality of flexible page group caches; and
- a cache manager configured to allocate the page size to each flexible page group cache, manage cache page information on the page sizes allocated to the plurality of flexible page group caches, and control the plurality of flexible page group caches and the shared cache based on the cache page information,
wherein the plurality of flexible page group caches are implemented with a plurality of set associative caches and the shared cache is implemented with a fully associative cache.

20. An address translation cache (ATC) configured to store translation entries indicating mapping information between a virtual address and a physical address of a memory device, the ATC comprising:
- a plurality of function-dedicated caches dedicated to a plurality of functions and implemented with a plurality of fully associative caches, each function-dedicated cache configured to store translation entries related to a respective function;
- a plurality of flexible page group caches implemented with a plurality of set associative caches, each flexible page group cache configured to store translation entries corresponding to a page size allocated to the flexible group cache and not stored in the plurality of function-dedicated caches;
- a shared cache implemented with a fully associative cache, the shared cache configured to store, regardless of page sizes, translation entries that are not stored in the plurality of function-dedicated caches or the plurality of flexible page group caches; and
- a cache manager configured to allocate the page size to each flexible page group cache, manage cache page information on the page sizes allocated to the plurality of flexible page group caches, and control the plurality of flexible page group caches and the shared cache based on the cache page information.

* * * * *